US008443795B2

(12) United States Patent
Kimura et al.

(10) Patent No.: US 8,443,795 B2
(45) Date of Patent: *May 21, 2013

(54) USE OF BRACKETS AND RAILS IN CONCENTRATING SOLAR ENERGY COLLECTORS

(75) Inventors: Darren T. Kimura, Mililani, HI (US); Susanne M. Spiessberger, Honolulu, HI (US); Kip H. Dopp, Kailua, HI (US)

(73) Assignee: Sopogy, Inc., Honolulu, HI (US)

( * ) Notice: Subject to any disclaimer, the term of this patent is extended or adjusted under 35 U.S.C. 154(b) by 672 days.

This patent is subject to a terminal disclaimer.

(21) Appl. No.: 11/811,109

(22) Filed: Jun. 8, 2007

(65) Prior Publication Data

US 2008/0127967 A1     Jun. 5, 2008

Related U.S. Application Data

(60) Provisional application No. 60/812,177, filed on Jun. 8, 2006.

(51) Int. Cl.
*F24J 3/02* (2006.01)
*F24F 7/00* (2006.01)

(52) U.S. Cl.
USPC .......... 126/696; 126/438; 126/439; 126/424; 126/271; 126/451

(58) Field of Classification Search
USPC ............... 126/684, 690, 696; 52/580, 586.2, 52/802.1; 454/900; 244/124, 123.1
See application file for complete search history.

(56) References Cited

U.S. PATENT DOCUMENTS

| 1,317,032 | A | * | 9/1919 | Page ................................ 52/84 |
| 2,339,565 | A |   | 1/1944 | Goldberg et al. |
| 2,425,033 | A |   | 8/1947 | Fletcher |
| 2,846,167 | A | * | 8/1958 | Walsh ........................... 244/124 |
| 3,906,927 | A |   | 9/1975 | Caplan |
| 4,011,858 | A |   | 3/1977 | Hurkett |
| 4,038,971 | A | * | 8/1977 | Bezborodko ................. 126/606 |
| 4,038,972 | A | * | 8/1977 | Orrison ......................... 126/578 |
| 4,045,246 | A |   | 8/1977 | Mlavsky et al. |
| 4,059,094 | A |   | 11/1977 | Barrio de Mendoza |
| 4,069,812 | A |   | 1/1978 | O'Neill |
| 4,083,359 | A |   | 4/1978 | Smith |
| 4,098,264 | A |   | 7/1978 | Brokaw |
| 4,103,672 | A |   | 8/1978 | Meyer |
| 4,106,480 | A |   | 8/1978 | Lyon et al. |

(Continued)

FOREIGN PATENT DOCUMENTS

| AU | 2004 202 597 A1 | 1/2005 |
| CH | 637 202 A5 | 7/1983 |

(Continued)

OTHER PUBLICATIONS

International Search Report mailed on May 21, 2008, for PCT Application No. PCT/US2007/013618, filed on Jun. 8, 2007, thirteen pages.

(Continued)

*Primary Examiner* — Steven B. McAllister
*Assistant Examiner* — Nikhil Mashruwala
(74) *Attorney, Agent, or Firm* — K&L Gates LLP

(57) ABSTRACT

Examples and variations of apparatus and Methods for concentrating solar radiation are disclosed.

29 Claims, 26 Drawing Sheets

U.S. PATENT DOCUMENTS

| Patent No. | | Date | Inventor | Ref |
|---|---|---|---|---|
| 4,106,484 | A | 8/1978 | Dame | |
| 4,108,154 | A | 8/1978 | Nelson | |
| 4,115,177 | A | 9/1978 | Nelson | |
| 4,116,221 | A | 9/1978 | Zaugg | |
| 4,135,493 | A | 1/1979 | Kennedy | |
| 4,136,671 | A * | 1/1979 | Whiteford | 126/654 |
| 4,138,994 | A | 2/1979 | Shipley, Jr. | |
| 4,139,270 | A | 2/1979 | Dotson | |
| 4,159,629 | A | 7/1979 | Korr et al. | |
| 4,159,712 | A | 7/1979 | Legg | |
| 4,167,178 | A | 9/1979 | Brussels | |
| 4,173,397 | A | 11/1979 | Simpson | |
| 4,202,322 | A * | 5/1980 | Delgado et al. | 126/574 |
| 4,205,657 | A | 6/1980 | Kelly | |
| 4,205,659 | A | 6/1980 | Beam | |
| 4,206,747 | A | 6/1980 | Niedermeyer | |
| 4,234,301 | A | 11/1980 | Hayes et al. | |
| 4,235,225 | A | 11/1980 | Doebel | |
| 4,236,399 | A | 12/1980 | Williams et al. | |
| 4,240,406 | A | 12/1980 | Hutchison | |
| 4,243,301 | A * | 1/1981 | Powell | 359/847 |
| 4,256,091 | A * | 3/1981 | Pier St. | 126/694 |
| 4,263,893 | A | 4/1981 | Pavlak et al. | |
| 4,268,332 | A | 5/1981 | Winders | |
| 4,269,168 | A | 5/1981 | Johnson | |
| 4,273,104 | A | 6/1981 | Uroshevich | |
| 4,297,003 | A * | 10/1981 | Hutchison | 359/852 |
| 4,304,221 | A | 12/1981 | Trihey | |
| 4,313,422 | A | 2/1982 | McEntee | |
| 4,317,444 | A | 3/1982 | Maruko | |
| 4,326,773 | A | 4/1982 | Colas | |
| 4,340,031 | A | 7/1982 | Niedermeyer | |
| 4,340,034 | A | 7/1982 | Hopper | |
| 4,390,241 | A | 6/1983 | Trihey | |
| 4,413,618 | A | 11/1983 | Pitts et al. | |
| 4,416,263 | A | 11/1983 | Niedermeyer | |
| 4,421,104 | A | 12/1983 | Adcock | |
| 4,423,719 | A * | 1/1984 | Hutchison | 126/694 |
| 4,432,343 | A | 2/1984 | Riise et al. | |
| 4,436,373 | A | 3/1984 | Kirsch | |
| 4,439,020 | A | 3/1984 | Maruko | |
| 4,454,371 | A | 6/1984 | Folino | |
| 4,465,057 | A | 8/1984 | Nikkel et al. | |
| 4,493,313 | A | 1/1985 | Eaton | |
| 4,508,426 | A | 4/1985 | Hutchison | |
| 4,510,923 | A | 4/1985 | Bronstein | |
| 4,515,148 | A | 5/1985 | Boy-Marcotte et al. | |
| 4,520,794 | A * | 6/1985 | Stark et al. | 126/684 |
| 4,523,575 | A | 6/1985 | Nikkel et al. | |
| 4,545,366 | A | 10/1985 | O'Neill | |
| 4,561,423 | A | 12/1985 | Blasey | |
| 4,571,812 | A | 2/1986 | Gee | |
| 4,596,238 | A | 6/1986 | Bronstein | |
| 4,604,990 | A | 8/1986 | Nikkel et al. | |
| 4,611,575 | A | 9/1986 | Powell | |
| 4,672,949 | A | 6/1987 | O'Neill | |
| 4,678,292 | A * | 7/1987 | Miyatani et al. | 359/848 |
| 4,711,972 | A | 12/1987 | O'Neill | |
| 4,719,904 | A | 1/1988 | O'Neill | |
| 4,770,162 | A | 9/1988 | L'Esperance et al. | |
| 4,807,592 | A | 2/1989 | Trihey | |
| 4,820,033 | A | 4/1989 | Sick | |
| 4,874,225 | A | 10/1989 | Pruszenski, Jr. | |
| 4,930,493 | A | 6/1990 | Sallis | |
| 5,058,565 | A | 10/1991 | Gee et al. | |
| 5,069,540 | A | 12/1991 | Gonder | |
| 5,071,243 | A | 12/1991 | Bronstein | |
| 5,150,253 | A | 9/1992 | Watanuki | |
| 5,325,844 | A | 7/1994 | Rogers et al. | |
| 5,465,708 | A | 11/1995 | Goebel et al. | |
| 5,498,297 | A | 3/1996 | O'Neill et al. | |
| 5,505,789 | A | 4/1996 | Fraas et al. | |
| 5,540,217 | A * | 7/1996 | Myles et al. | 126/692 |
| 5,673,684 | A | 10/1997 | Myles, III et al. | |
| 5,699,785 | A | 12/1997 | Sparkman | |
| 5,794,611 | A | 8/1998 | Bottum, Jr. et al. | |
| 5,934,271 | A | 8/1999 | Kaneff | |
| 5,937,849 | A * | 8/1999 | Myles et al. | 126/562 |
| 5,964,216 | A | 10/1999 | Hoffschmidt et al. | |
| 6,020,554 | A | 2/2000 | Kaminar et al. | |
| 6,031,179 | A | 2/2000 | O'Neill | |
| 6,075,200 | A | 6/2000 | O'Neill | |
| 6,111,190 | A | 8/2000 | O'Neill | |
| 6,498,290 | B1 | 12/2002 | Lawheed | |
| 6,501,013 | B1 | 12/2002 | Dinwoodie | |
| 6,543,441 | B2 | 4/2003 | Fünger et al. | |
| 6,579,584 | B1 | 6/2003 | Compton | |
| 6,668,820 | B2 | 12/2003 | Cohen et al. | |
| 6,696,637 | B2 | 2/2004 | Lawheed | |
| 6,705,311 | B1 | 3/2004 | Schwartzman et al. | |
| 6,729,588 | B2 | 5/2004 | Wilkinson, III | |
| 6,832,608 | B2 | 12/2004 | Barkai et al. | |
| 6,959,993 | B2 | 11/2005 | Gross et al. | |
| D516,903 | S | 3/2006 | Friedline et al. | |
| 7,156,088 | B2 | 1/2007 | Luconi | |
| 7,192,146 | B2 | 3/2007 | Gross et al. | |
| 2002/0078945 | A1 | 6/2002 | Funger et al. | |
| 2002/0139656 | A1 | 10/2002 | Reid | |
| 2002/0179138 | A1 | 12/2002 | Lawheed | |
| 2003/0051750 | A1 | 3/2003 | Lawheed | |
| 2003/0201008 | A1 | 10/2003 | Lawheed | |
| 2003/0210483 | A1 | 11/2003 | Wright | |
| 2004/0004827 | A1 | 1/2004 | Guest | |
| 2004/0055594 | A1 | 3/2004 | Hochberg et al. | |
| 2004/0118395 | A1 | 6/2004 | Rubbia et al. | |
| 2004/0216734 | A1 | 11/2004 | Lawheed | |
| 2004/0261788 | A1 | 12/2004 | Winston | |
| 2005/0217716 | A1 | 10/2005 | Masuda et al. | |
| 2005/0225885 | A1* | 10/2005 | Wright | 359/871 |
| 2005/0229924 | A1 | 10/2005 | Luconi et al. | |
| 2006/0144393 | A1 | 7/2006 | Le Lievre | |
| 2006/0150967 | A1 | 7/2006 | Hoelle et al. | |
| 2006/0157050 | A1 | 7/2006 | Le Lievre | |
| 2007/0240704 | A1 | 10/2007 | Prueitt | |
| 2008/0078379 | A1 | 4/2008 | Kimura et al. | |
| 2008/0078380 | A1 | 4/2008 | Kimura et al. | |
| 2008/0083405 | A1 | 4/2008 | Kimura et al. | |
| 2008/0092878 | A1 | 4/2008 | Kimura et al. | |
| 2008/0127967 | A1 | 6/2008 | Kimura et al. | |
| 2011/0073104 | A1* | 3/2011 | Dopp et al. | 126/651 |

FOREIGN PATENT DOCUMENTS

| | | |
|---|---|---|
| DE | 25 58 767 A1 | 7/1977 |
| DE | 27 38 859 A1 | 3/1979 |
| DE | 32 14 765 A1 | 11/1983 |
| DE | 38 22 178 A1 | 1/1990 |
| DE | 101 30 757 A1 | 1/2003 |
| DE | 203 18 080 U1 | 5/2005 |
| FR | 2 459 429 A1 | 1/1981 |
| JP | 55065903 A | 5/1980 |
| JP | 59-038555 A | 3/1984 |
| JP | 2003050057 * | 2/2003 |
| JP | 2004-205062 A | 7/2004 |
| WO | WO-83/00064 A1 | 1/1983 |
| WO | WO-91/14955 A1 | 10/1991 |
| WO | WO-95/06846 A | 3/1995 |
| WO | WO-96/29745 A1 | 9/1996 |
| WO | WO-99/64795 A2 | 12/1999 |
| WO | WO-99/64795 A3 | 12/1999 |
| WO | WO-01/02780 A1 | 1/2001 |
| WO | WO-02/44628 A1 | 6/2002 |
| WO | WO-02/097341 A1 | 12/2002 |
| WO | WO-02/103256 A1 | 12/2002 |
| WO | WO-02/103256 C1 | 12/2002 |
| WO | WO-03/042609 A1 | 5/2003 |
| WO | WO-2005/003645 A1 | 1/2005 |
| WO | WO 2005/020290 A | 3/2005 |
| WO | WO-2005/090873 A1 | 9/2005 |
| WO | WO-2005/119133 A2 | 12/2005 |
| WO | WO-2006/027003 A1 | 3/2006 |
| WO | WO-2006/138619 A2 | 12/2006 |
| WO | WO-2007/044384 A2 | 4/2007 |
| WO | WO-2007/044384 A3 | 4/2007 |
| WO | WO-2007/044385 A2 | 4/2007 |
| WO | WO-2007/044385 A3 | 4/2007 |
| WO | WO-2007/087680 A1 | 8/2007 |
| WO | WO-2007/146183 A2 | 12/2007 |

| WO | WO-2008/153936 A1 | 12/2008 |
| WO | WO-2009/146215 A3 | 12/2009 |
| WO | WO 2010/016934 A9 | 2/2010 |

OTHER PUBLICATIONS

Written Opinion mailed on May 21, 2008, for PCT Application No. PCT/US2007/013618, filed on Jun. 8, 2007, thirteen pages.

Non-Final Office Action mailed on Aug. 20, 2008, for U.S. Appl. No. 11/811,153, filed Jun. 8, 2007, seven pages.

Amendment filed Apr. 26, 2010 to Non-Final Office Action mailed Oct. 26, 2009, for U.S. Appl. No. 11/811,329, filed Jun. 8, 2007, 11 pages.

Final Office Action mailed Jul. 21, 2010, for U.S. Appl. No. 11/811,329, filed Jun. 8, 2007, 11 pages.

International Preliminary Report on Patentability/Written Opinion dated Dec. 10, 2008 (mailed-on Dec. 24, 2008) for PCT Application No. PCT/US2007/013618, filed on Jun. 8, 2007, 13 pages.

International Preliminary Report on Patentability dated Dec. 11, 2009, 1 pg., with Written Opinion 8 pg., for PCT Application No. PCT/US2008/007115, filed on Jun. 8, 200B, 9 pages.

International Search Report and Written Opionion (mailing date of ISR Oct. 10, 2006) for PCT Application No. PCT/US2008/007115, filed on Jun. 8, 2008, 16 pages.

ISR and Written Opinion mailing date Nov. 12, 2009 for PCT Application No. PCT/US2009/041171, filed on Apr. 20, 2009; 27 pages.

Amendment mailed May 4, 2009, in Response to Non-Final Office Action, for U.S. Appl. No. 11/811,073, eight pages.

Amendment mailed Feb. 22, 2010, to Non-Final Office Action dated Aug. 20, 2009, for U.S. Appl. No. 11/811,073, filed Jun. 8, 2007, eleven pages.

Final Office Action mailed on May 26, 2010, for U.S. Appl. No. 11/811,073, filed Jun. 8, 2007, eleven pages.

Non-Final Office Action mailed on Oct. 26, 2009, for U.S. Appl. No. 11/811,329, filed Jun. 8, 2007, eight pages.

International Preliminary Report on Patentability and Written Opinion mailed on Dec. 24, 2008, for PCT Application No. PCT/US2007/013618, filed on Jun. 8, 2007, thirteen pages.

U.S. Appl. No. 11/811,073 Notice of Allowance dated Apr. 14, 2011; 13 pages.

U.S. Appl. No. 11/811,329, Supplemental Amendment filed Jun. 16, 2011; 15 pages.

U.S. Appl. No. 11/811,329, Interview Summary mailed Jun. 21, 2011; 3 pages.

U.S. Appl. No. 11/811,329, Final Office Action mailed Jul. 6, 2011; 10 pages.

Non-Final Office Action mailed on Jan. 8, 2009, for U.S. Appl. No. 11/811,027, filed Jun. 8, 2007, nine pages.

Non-Final Office Action mailed on Mar. 6, 2009, for U.S. Appl. No. 11/811,073, filed Jun. 8, 2007, 6 pages.

Non-Final Office Action mailed on Aug. 20, 2009, for U.S. Appl. No. 11/811,073, filed Jun. 8, 2007, ten pages.

International Preliminary Report on Patentability and Written Opinion mailing date Oct. 19, 2010, for PCT Application No. PCT/US2009/0041171, filed on Apr. 20, 2009, 12 pages.

International Report on Patentability and Written Opinion (date of report issuance Feb. 8, 2011) for PCT Application No. PCT/US2009/004539, filed on Aug. 6, 2009, 11 pages.

Office Action dated Apr. 28, 2011 for U.S. Appl. No. 12/378,911, filed Feb. 20, 2009, 20 pages.

Interview Summary dated Nov. 30, 2010 for U.S. Appl. No. 11/811,073, filed Jun. 8, 2007, 4 pages.

Interview Summary dated Feb. 15, 2011 for U.S. Appl. No. 11/811,073, filed Jun. 8, 2007; 4 pages.

Amendment filed Apr. 1, 2011 to Non-Final Office Action mailed Nov. 22, 2010, for U.S. Appl. No. 11/811,329, filed Jun. 8, 2007, 10 pages.

Non-Final Office Action mailed Nov. 22, 2010, for U.S. Appl. No. 11/811,329, filed Jun. 8, 2007, 11 pages.

International Search Report (mailing date of ISR Nov. 2, 2010) for PCT Application No. PCT/US2009/004539, filed on Aug. 6, 2009, 6 pages.

U.S. Appl. No. 12/378,911 Amendment mailed Oct. 28, 2011; 11 pages.

U.S. Appl. No. 12/378,911 Supplemental Amendment mailed Nov. 2, 2011; 7 pages.

Amendment filed Sep. 27, 2010 in Response to Final Office Action dated May 26, 2010 for U.S. Appl. No. 11/811,073, filed Jun. 8, 2007 12 pages.

Amendment filed Nov. 26, 2010 in Response to Final Office Action dated May 26, 2010 for U.S. Appl. No. 11/811,073, filed Jun. 8, 2007 12 pages.

International Search Report mailed on Nov. 2, 2010 for PCT Application No. PCT/US2009/004539, filed on Aug. 6, 2009, 6 pages.

Written Opinion mailed with ISR Nov. 2, 2010 for PCT Application No. PCT/US2009/004539, filed on Aug. 6, 2009, 11 pages.

International Preliminary Report on Patentability mailed Oct. 28, 2010 for PCT Application No. PCT/US2008/007115, filed on Apr. 20, 2009, 2 pages.

Non-Final Office Action mailed Nov. 22, 2010 for U.S. Appl. No. 11/811,329 (filed Jun. 8, 2007), 11 pages.

* cited by examiner

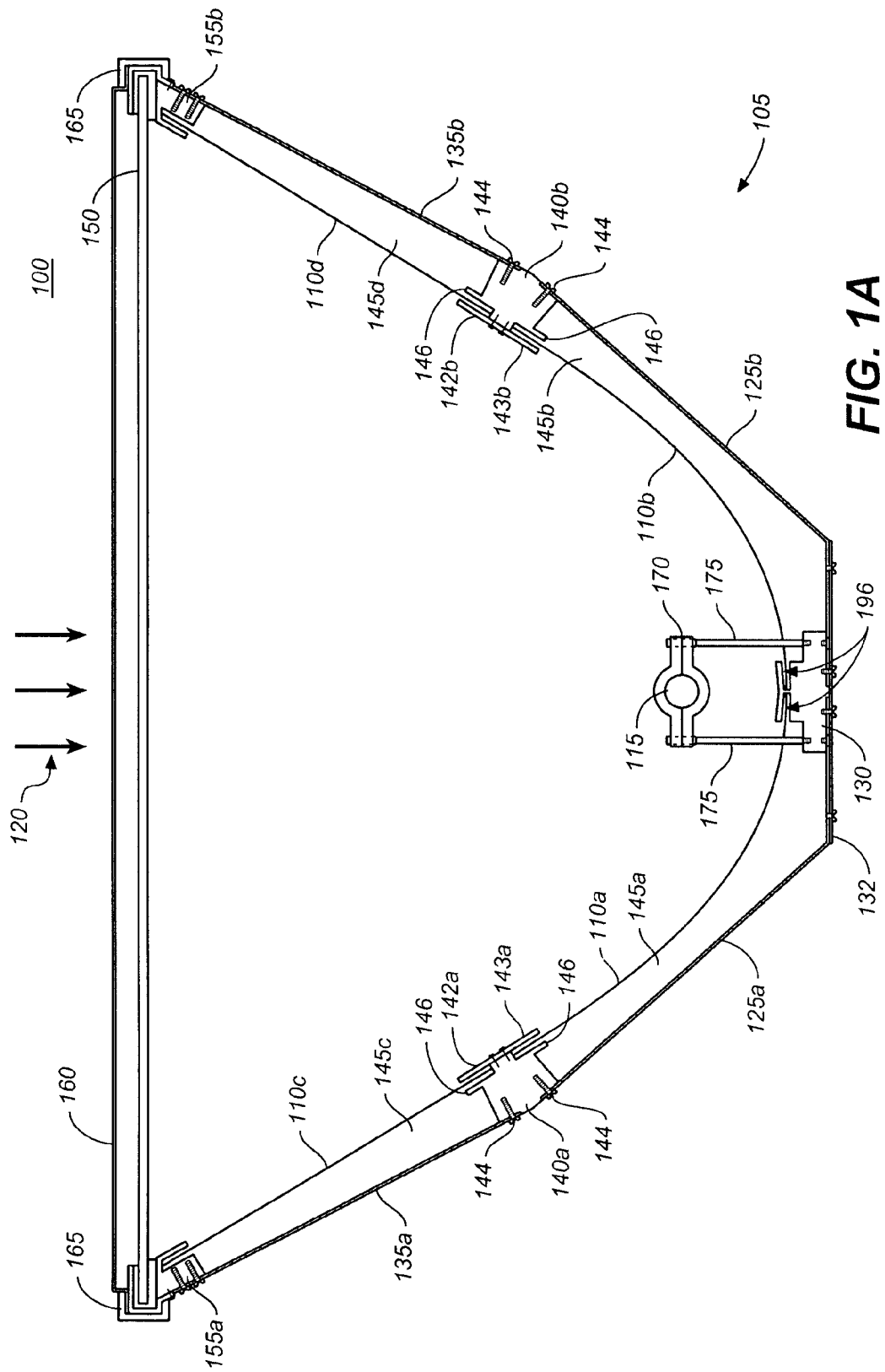

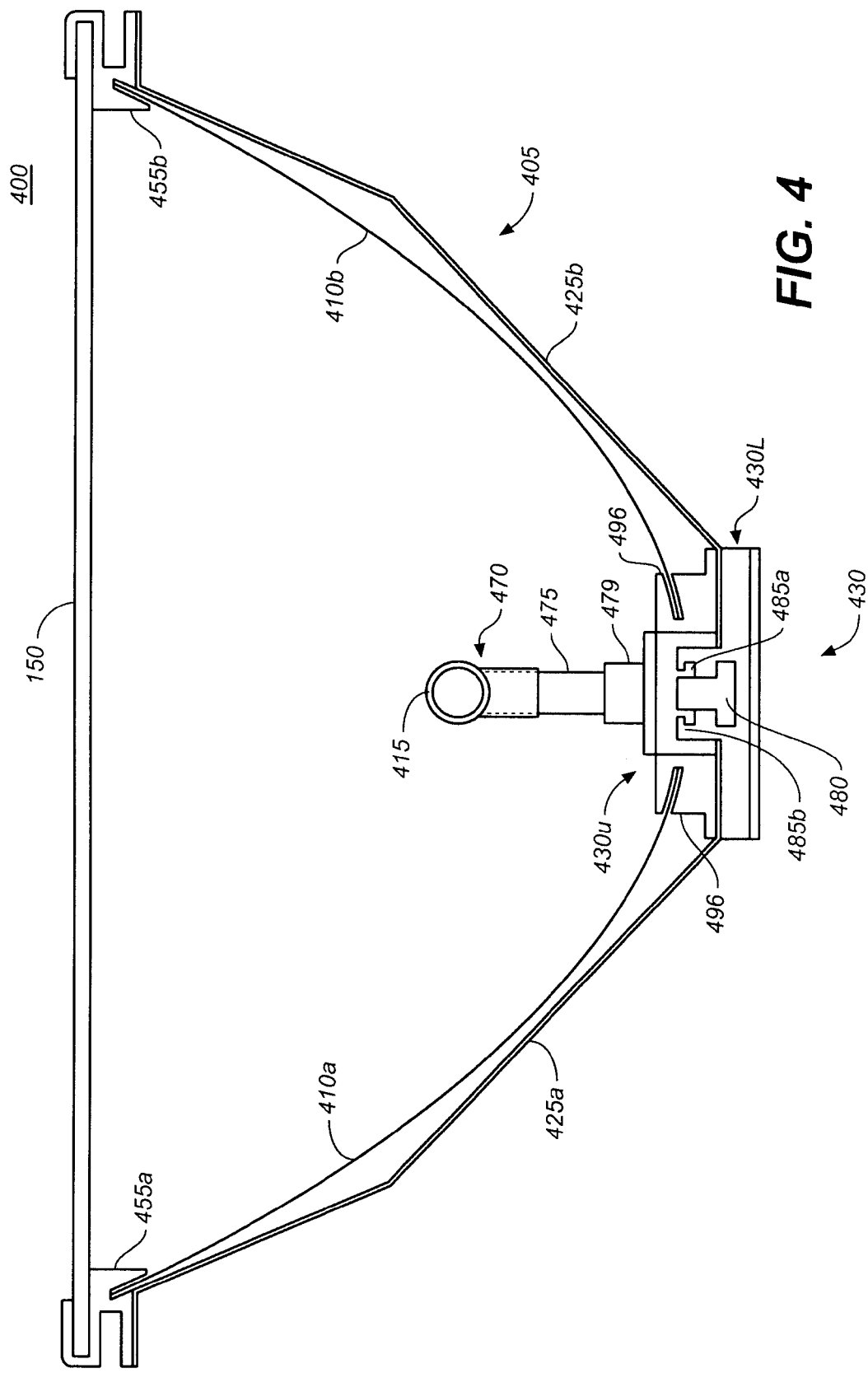

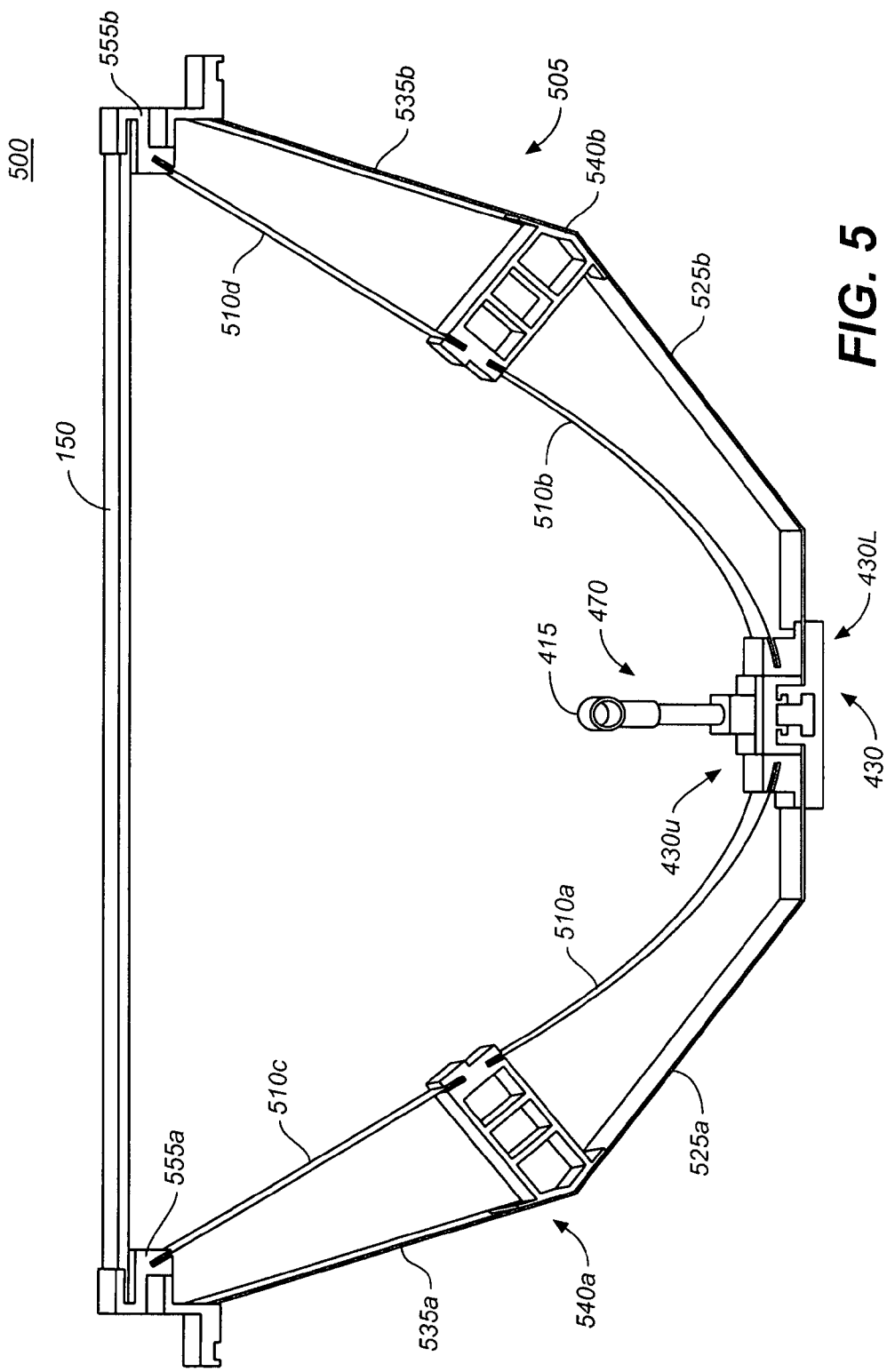

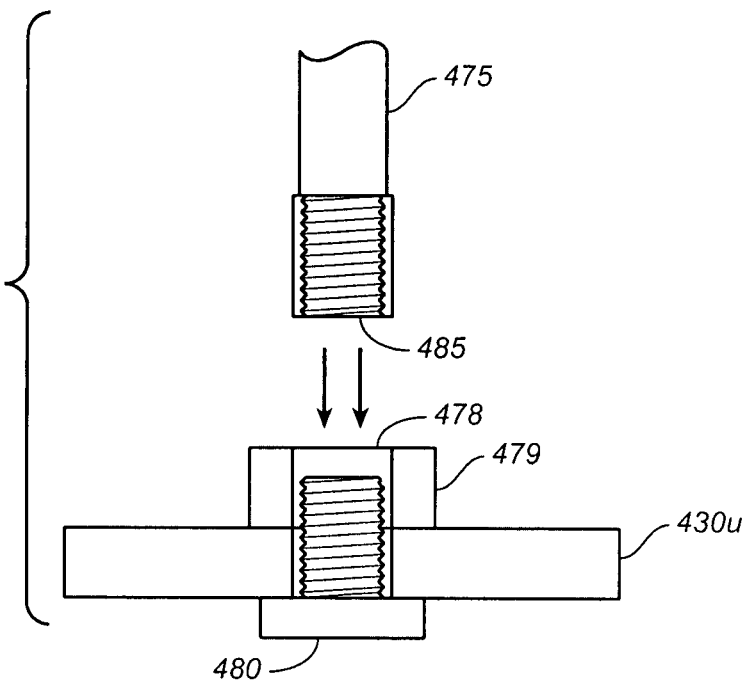

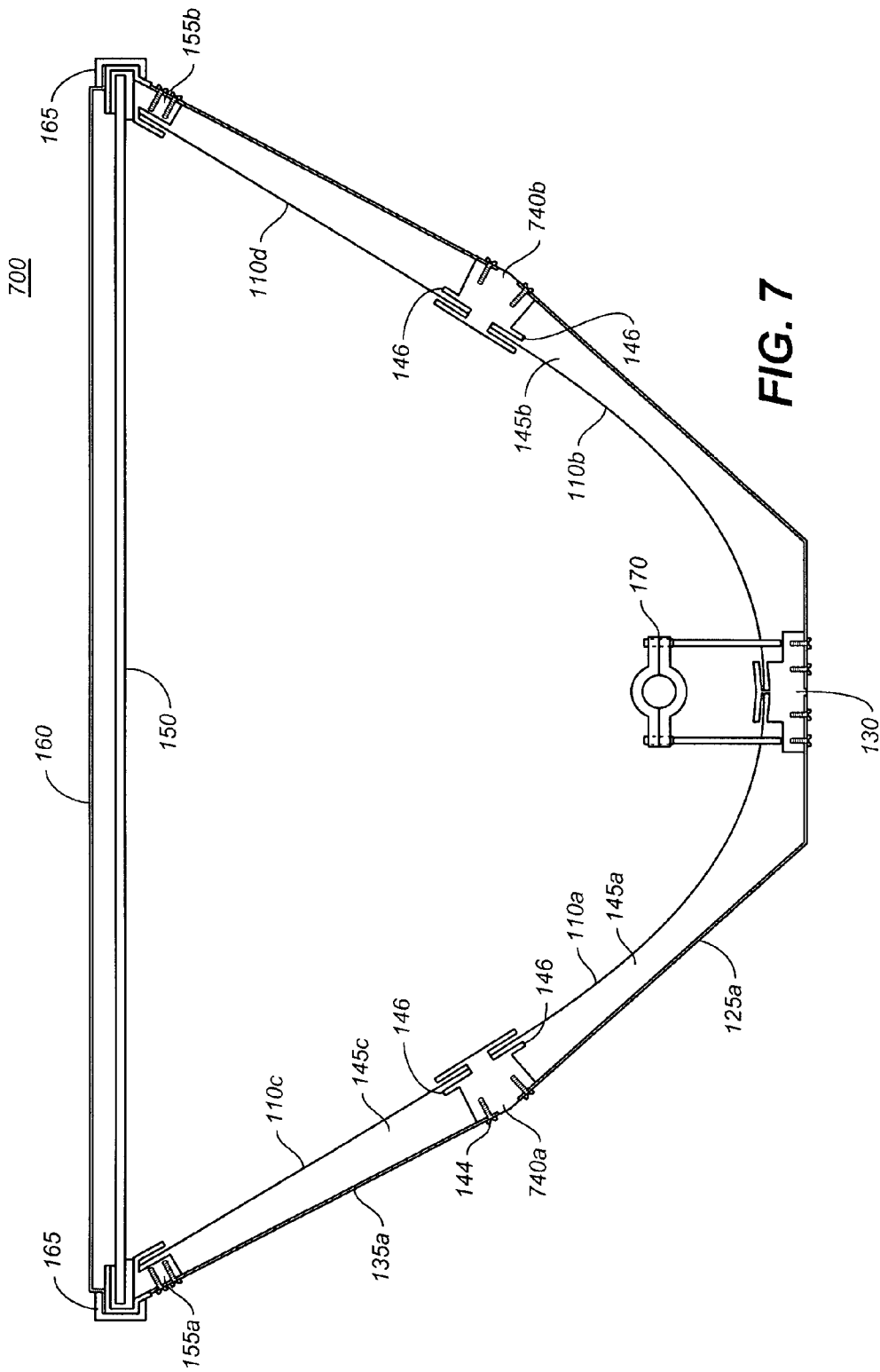

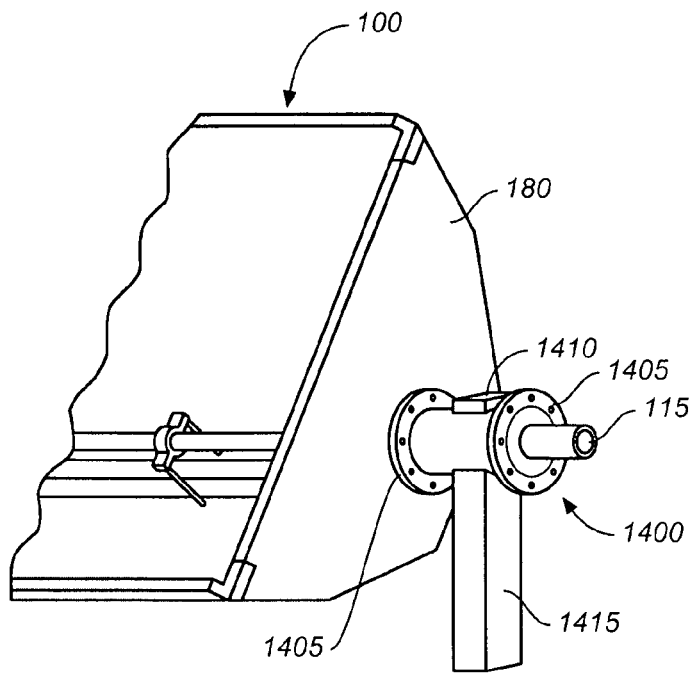
FIG. 14A
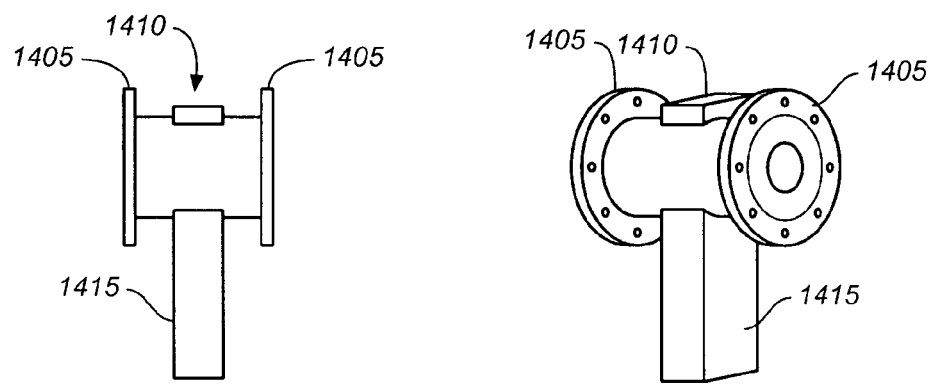
FIG. 14B  FIG. 14C

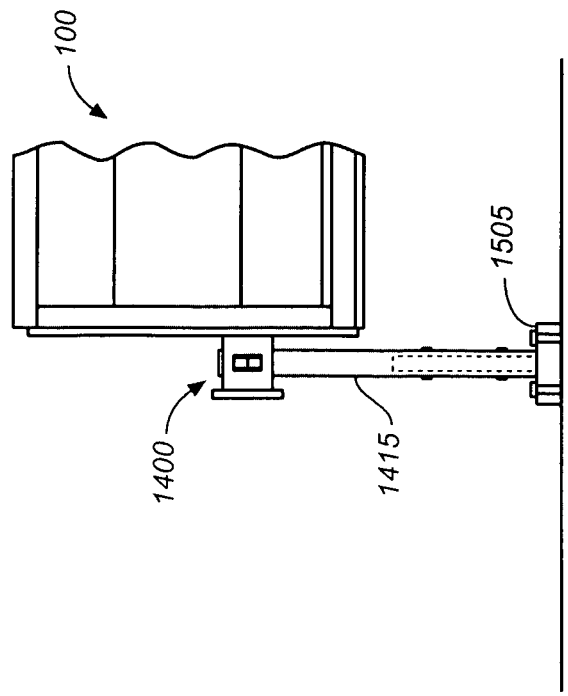
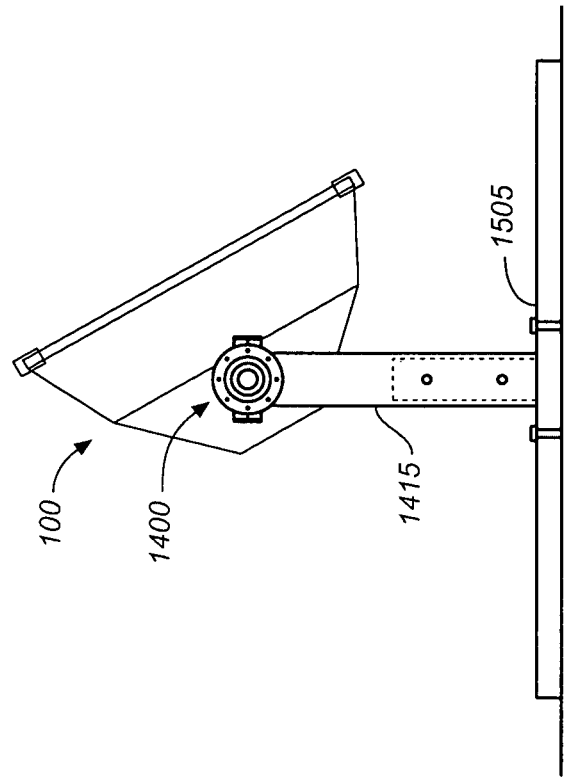
FIG. 16A
FIG. 16B

USE OF BRACKETS AND RAILS IN CONCENTRATING SOLAR ENERGY COLLECTORS

CROSS-REFERENCE TO RELATED APPLICATIONS

This applications claims priority to U.S. Provisional Patent Application Ser. No. 60/812,177, filed Jun. 8, 2006, titled "Concentrated Solar Trough with Sun Tracking, Storm Protection and Removable Reflectors," incorporated herein by reference in its entirety.

BACKGROUND OF THE INVENTION

Solar energy can provide an environmentally friendly source of energy that does not rely on extraction of fossil fuels and that contributes relatively less to global warming and to related environmental problems than do fossil fuel-based energy sources. In addition, in many cases solar energy can be captured and used locally and thus reduce requirements for transportation or importation of fuels such as petroleum.

Solar energy may be captured, for example, by a collector that absorbs solar radiation and converts it to heat, which may then be used in a variety of applications. Alternatively, solar radiation may be captured by a collector which absorbs solar radiation and converts a portion of it directly to electricity by photovoltaic methods, for example. Mirrors or lenses may be used to collect and concentrate solar radiation to be converted to heat or electricity by such methods.

BRIEF SUMMARY OF THE INVENTION

In one aspect, a concentrating solar energy collector comprises a frame or housing, a heat collector, and a first elastically deformable reflector. The first elastically deformable reflector is at least substantially flat absent deforming force. The frame or housing is configured to receive the first elastically deformable reflector and exert compressive force that maintains the first elastically deformable reflector in a shape that concentrates at least a portion of the solar radiation on the heat collector.

In a second aspect, a concentrating solar energy collector comprises a heat collector, a first reflector positioned to receive solar radiation and concentrate at least a portion of the solar radiation on the heat collector, the first reflector having a length and a longitudinal edge, and a first bracket having a length of at least the length of the first reflector and configured to engage the longitudinal edge of the first reflector.

In a third aspect, a concentrating solar energy collector comprises a housing, a first bracket having a slot, a heat collector, and a first reflector positioned in the housing to receive solar radiation and concentrate at least a portion of the solar radiation on the heat collector. The reflector is coupled to the housing by insertion of at least a portion of an edge of the reflector into the slot in the bracket.

In a fourth aspect, a concentrating solar energy collector comprises a housing comprising a first panel and a second panel, a first bracket connecting the first panel and the second panel, a heat collector, and a first reflector positioned within the housing to receive solar radiation and concentrate at least a portion of the solar radiation on the heat collector.

In a fifth aspect, a concentrating solar energy collector comprises a first and a second panel, a first bracket configured to couple the first and second panels to each other to form at least a portion of a bottom section of a housing, a heat collector, and a first reflector positioned within the housing to receive solar radiation and concentrate at least a portion of the solar radiation on the heat collector.

In a sixth aspect, a concentrating solar energy collector comprises a bottom portion of a housing, a first and a second panel, and a first and a second bracket. The first bracket is configured to couple the first panel to the bottom portion of the housing to form at least a portion of a first side of the housing and the second bracket is configured to couple the second panel to the bottom portion of the housing to form at least a portion of a second side of the housing. The solar energy collector also comprises a heat collector and a first reflector positioned within the housing to receive solar radiation and concentrate at least a portion of the solar radiation on the heat collector.

In a seventh aspect, a concentrating solar energy collector comprises a housing, a first bracket at or near an edge of the housing. The bracket is configured to engage with a transparent cover, a heat collector, and a first reflector positioned in the housing to receive solar radiation through the transparent cover and concentrate at least a portion of the solar radiation on the heat collector.

In an eighth aspect, an appliance comprising a concentrating solar energy collector has a housing having a bottom portion and side portions, a heat collector, a first reflector positioned within the housing to receive solar radiation and concentrate at least a portion of the solar radiation on the heat collector, and an impact resistant cover configured to be positioned over at least a substantial portion of the housing and removably coupled to the housing to allow convenient removal and replacement.

In a ninth aspect, a concentrating solar energy collector comprises a heat collector, first and second identical or substantially identical panels forming at least a portion of a housing, and a first reflector positioned within the housing to receive solar radiation and concentrate at least a portion of the solar radiation on the heat collector.

In a tenth aspect, a concentrating solar energy collector comprises a frame or a housing, a first reflector positioned within the frame or the housing to receive solar radiation and concentrate at least a portion of the solar radiation on the heat collector, and a heat collector. The heat collector is supported by the frame or the housing by a first heat collector support having a first stanchion and a second stanchion.

In an eleventh aspect, a concentrating solar energy collector comprises a frame or housing, a heat collector, a first reflector, and a storage reservoir attached to the frame or housing. The storage reservoir is in fluid communication with the heat collector.

In a twelfth aspect, a method of assembling a concentrating solar energy collector comprises flexing at least a first elastically deformable reflector to position it within a housing. The elastically deformable reflector is substantially flat absent deforming forces and the housing is configured to receive the first elastically deformable reflector and maintain it in a shape that concentrates at least a portion of incident solar radiation on a heat collector.

In a thirteenth aspect, a method of assembling a concentrating solar energy collector comprises coupling a first panel to a second panel with a first bracket to form at least a portion of a bottom section of a housing, coupling a third panel to the bottom section of the housing with a second bracket to form at least a portion of a first side of the housing, coupling a fourth panel to the bottom section of the housing with a third bracket to form at least a portion of a second side of the housing, and positioning at least one reflector within the housing to receive solar radiation and concentrate it on a heat collector.

In a fourteenth aspect, a method of operating a solar energy collector (the solar energy collector comprising a housing, a substantially transparent cover coupled to the housing, and a reflector positioned within the housing to receive solar radiation through the transparent cover) comprises removably positioning an impact resistant cover over at least a substantial portion of the transparent cover to at least partially protect the transparent cover and the reflector from impact. The impact resistant cover is removably positioned by removably attaching it to the housing, to the transparent cover, or to the housing and the transparent cover. The method further comprises removing the impact resistant cover during normal operation of the solar energy collector.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIGS. 1A-1D show several views of portions of an example solar energy collector according to one variation.

FIG. 4 shows a cross-sectional view of an example solar energy collector, according to one variation, comprising two mirrors and a single leg stanchion.

FIG. 5 shows a cross-sectional view of an example solar energy collector, according to one variation, comprising four mirrors and a single leg stanchion.

FIG. 6 shows a variation of a screw-in single leg stanchion.

FIG. 7 shows an example solar energy collector, according to one variation, having side brackets that differ from those of the solar energy collector of FIGS. 1A-1D by lack of restraining plates.

FIGS. 14A-C show a pivot assembly and its use in pivotably mounting solar energy collectors according to one variation.

FIGS. 16A-16B show views of a solar energy collector mounted on a roof or other hard surface according to one variation.

DETAILED DESCRIPTION OF THE INVENTION

Figure 1B:
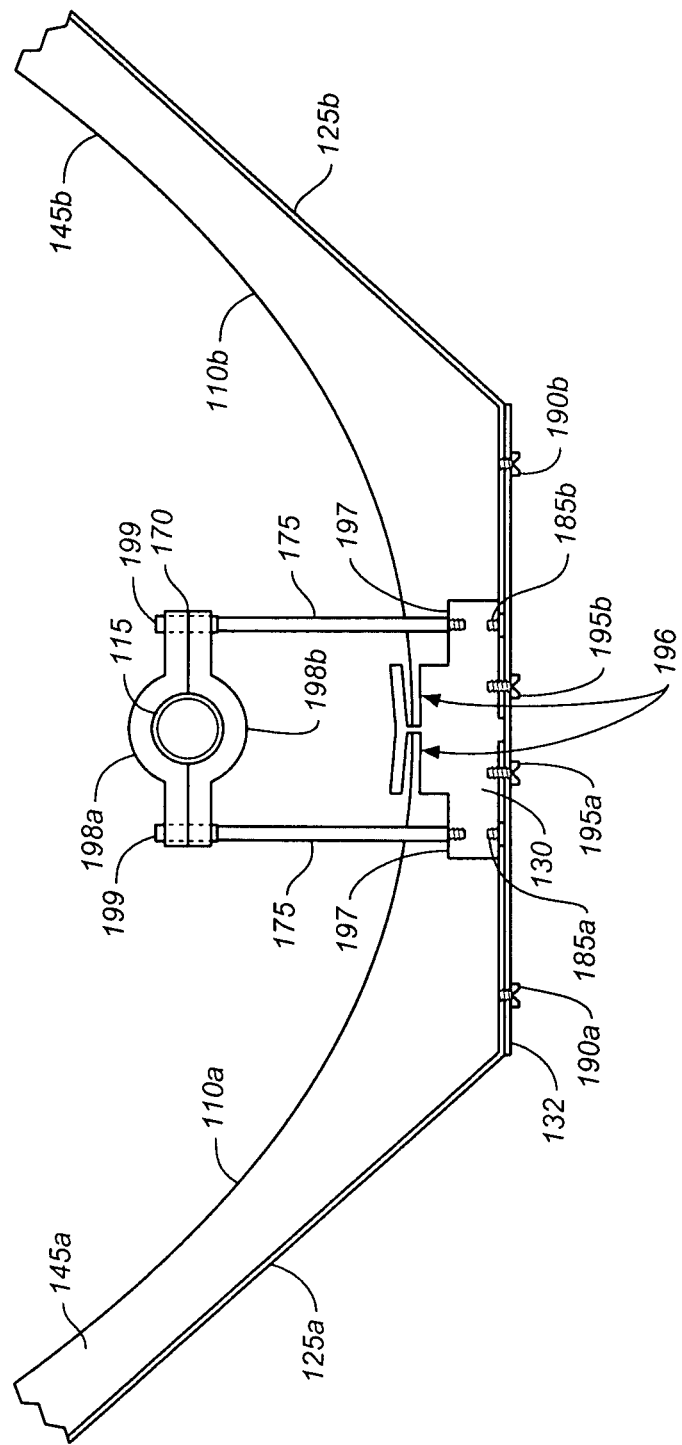

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be noted that, as used in this specification and the appended claims, the singular forms "a," "an" and "the" include plural referents unless the context clearly indicates otherwise.

Disclosed herein are examples and variations of apparatus and methods for collecting and concentrating solar radiation. This detailed description begins with a general discussion of the features of an example concentrating solar energy collector. That discussion is followed by additional description, set out under headings, of the details of and some variations of various possible features and aspects of solar energy collectors as disclosed herein. Additional examples of solar energy collectors are then provided, followed by a discussion of methods for assembling some variations of the disclosed solar energy collectors and by a discussion of some possible uses of the disclosed solar energy collectors.

Referring now to FIGS. 1A-1D, one example solar energy collector 100 comprises a housing 105, mirrors 110a-110d disposed within the housing, and a heat collector 115. Mirrors 110a-110d focus a portion of incident solar radiation 120 onto heat collector 115 to heat a working (e.g., heat transfer) fluid within heat collector 115. The working fluid may reach temperatures of, for example, greater than 400° F. More generally, the working fluid may reach temperatures from, for example, about 100° F. to about 400° F., about 100° F. to 550° F., or from about 200° F. to about 550° F. The heated working fluid may then be used in any suitable application, some of which are described later in this detailed description.

In this example housing 105 comprises lower panels 125a and 125b coupled to each other by a base bracket 130 to form a lower portion of housing 105. Base plate 132 coupled to base bracket 130 and to lower panels 125a, 125b provides further structural support to the bottom portion of housing 105. Upper side portions of housing 105 are formed by upper panel 135a coupled by side bracket 140a to lower panel 125a, and by upper panel 135b coupled by side bracket 140b to lower panel 125b. Ribs 145a-145d, attached respectively to panels 125a, 125b, 135a, 135b and engaging side brackets 140a and 140b, provide support for mirrors 110a-110d and additional structural strength to housing 105.

The top of housing 105 is closed by transparent cover 150, which is coupled to panels 135a and 135b by upper brackets 155a and 155b, respectively. Impact resistant storm cover 160 may be coupled to housing 105 by one or more clips 165, as illustrated. Storm cover 160 is removed during normal operation, but may be put in place as shown to protect solar energy collector 100 and its components, particularly transparent cover 150, mirrors 110a-110d, and heat collector 115, from inclement weather, for example.

Heat collector 115 is supported by stanchion 170, which in this example includes two rods 175 engaging base bracket 130. Mirrors 110a-110d are coupled to housing 105, in this example, by brackets 130, 140a, 140b, 155a, and 155b as shown.

In one variation solar energy collector 100 may be, for example, about 8 feet long, about 2.5 feet tall, about 1.5 feet wide at the bottom, and about 5 feet wide at the top. In the illustrated example, solar energy collector 100 has a trough-like shape as defined, for example, by housing 105 and/or by mirrors 110a-110b. More generally, solar energy collectors disclosed herein, including solar energy collector 100, may be of any suitable size and shape. As additional examples, in some variations solar energy collectors 200 (FIG. 1) and 400 (FIG. 4) described later in this detailed description may have a trough-like shape and be, for example, about 8 feet long, about 15" tall, about 7" wide at the bottom, and about 30" wide at the top.

As described later in this detailed description, in some variations individual solar energy collectors disclosed herein may be joined together to form sections of two, three, or more collectors. The sections may be then be coupled together to form one or more rows. In some variations, the collectors in a row are driven to track the sun by motors at each end of the row, with support stands located between sections supporting bearings on which the sections may pivot. Individual collectors may be similarly driven to track the sun.

The motors used to pivot or otherwise orient solar energy collectors may be controlled by tracking devices, not shown, that determine the orientation of the sun and pivot the solar energy collectors to optimize collection of solar radiation. The tracking devices may be, for example, conventional solar tracking devices known to one of ordinary skill in the art. Such tracing devices may employ, for example, light intensity detectors (e.g., photovoltaic detectors) to detect the position of the sun and digital logic (e.g., hardware or software) or analog control methods to control the motors based on signals from the light intensity detectors.

In the illustrated example, housing 105 (including end caps 180, FIG. 1D) and transparent cover 150 enclose mirrors 110a-110d and heat collector 115 and may consequently protect these components from corrosion (e.g., caused by salt and humidity), abrasion (e.g., caused by dust or sand), and other environmental ill-effects. Solar energy collector 100 may be further weather-proofed, as discussed in greater detail later in this detailed description, by placing gasket material in joints between panels (e.g., 125a, 125b, 135a, 135b) and brackets (e.g., 130, 140a, 140b, 155a, and 155b) forming housing 105 and in joints between transparent cover 150 and brackets 155a and 155b to better seal those joints. In addition, transparent cover 150 and housing 105 may be constructed from impact resistant materials to better resist damage from storms or other inclement weather.

In such weather-proofed variations, solar energy collectors as disclosed herein may be well suited for use in tropical and coastal applications, where environmental conditions may promote corrosion, as well as in desert applications where sand, dust, or grit may otherwise abrade unprotected components. The various aspects of such weather proofing (including, for example, use of a transparent cover and/or sealing gaskets to enclose the mirrors and heat collector) are optional, however, and not necessarily present, or all present, in solar energy collectors disclosed herein.

The modular construction of a solar energy collector (or solar energy collector housing) from panels, brackets, and/or ribs, and/or the installation of mirrors in the housing brackets, may allow for easy assembly and repair and flexible arrangement and use of the solar energy collector. The use of sets of identical or substantially identical mirrors (e.g., 110a and 110b; 110c and 110d), panels (e.g., 125a and 125b; 135a and 135b), side brackets (e.g., 140a and 140b), upper brackets (e.g., 155a and 155b) and/or ribs (e.g., 145a-145d) may also provide such advantages. As used herein, identical components have identity of shape and size within manufacturing tolerances. Substantially identical components are sufficiently similar that they have the same general shape and size but may differ in, e.g., pieces attached or portions of shape. Substantially identical pieces are often formed of base pieces that are considered identical but are modified in some way with, for example, additional features.

In addition, in variations (some of which are described in greater detail below) in which some or all of the mirrors are substantially flat prior to installation and/or some or all of the panels are substantially flat, the components of the solar energy collector may be more easily manufactured, stored, packaged, and/or shipped to their ultimate point of use. Such modularity is optional, however, and solar energy collectors described herein may be constructed without or with less use of brackets, panels, substantially flat panels, substantially flat (when uninstalled) mirrors, and/or identical or substantially identical components.

As noted above and further explained below, solar energy collectors as disclosed herein need not include all features shown in FIGS. 1A-1D and may include additional features or variations of features not shown in these figures. Generally, any of the solar energy collectors described herein may include any suitable combination of the features (or their variations) described or shown herein as well as any modifications or variations thereof apparent to one of ordinary skill in the art. Additional details of the features of solar energy collectors (such as solar energy collector 100 shown in FIGS. 1A-1D) and variations thereof are described next under headings identifying the features.

Mirrors

Solar energy collector 100 shown in FIGS. 1A-1D comprises four mirrors 110a-110d arranged to concentrate solar radiation on heat collector 115. In other variations, however, the solar energy collectors disclosed herein may include more or fewer mirrors. For example, solar energy collectors may include a single large mirror in place of mirrors 110a-110d. Other variations include two mirrors such as mirrors 210a and 210b in solar energy collector 200 shown in FIG. 2. An example solar energy collector described later in this detailed description (FIG. 21) comprises six mirrors. Generally, any suitable number of mirrors may be used in any of the disclosed solar energy collectors.

In solar energy collector 100, mirrors 110a-110d are arranged to form a single substantially parabolic shape with a line focus approximately on a central axis of (tubular, in the illustrated example) heat collector 115. More generally, however, mirrors used in the solar energy collectors disclosed herein may have parabolic, cylindrical (partial circular cross section), or any other suitable shape. Where multiple mirrors are used, they may share a focus or instead be arranged to focus to two or more separate locations. For example, a solar energy collector may comprise four parabolic mirrors arranged to focus on four separate portions of a heat collector.

In addition, where multiple mirrors are used, two or more of the mirrors may be identical or substantially identical. As noted above, for example, in solar energy collector 100, mirror 110a is identical or substantially identical to mirror 110b, and mirror 110c is identical or substantially identical to mirror 110d. Similarly, mirrors 210a and 210b of solar energy collector 200 (FIG. 2) are identical or substantially identical. The use of sets of identical or substantially identical mirrors may, for example, simplify manufacturing, assembly, and repair of a solar energy collector. The use of two or more identical or substantially identical mirrors is not required, however.

Referring again to FIG. 1A, mirrors 110a-110d in solar energy collector 100 are made from an elastically deformable (e.g., springy) material that allows them to assume a substantially flat shape absent deforming forces but take a parabolic or other curved shape upon installation in housing 105. The parabolic shape of the installed mirrors 110a-110d results from compressive forces imposed on the mirrors by brackets 130, 140a, 140b, 155a, and 155b coupling the mirrors to housing 105 and/or from the shapes of ribs 145a-145 supporting the mirrors. Mirrors 210a and 210b in solar energy collector 200 (FIG. 2) are also made from an elastically deformable material and assume a substantially flat shape absent deforming forces. Mirrors 210a and 210b assume a parabolic shape as a result of compressive forces imposed on them by base bracket 230 and upper brackets 255a and 255b, which couple the mirrors to housing 205.

Such elastically deformable mirrors may be made, for example, from highly reflective aluminum sheets such as coated (weather-proofed) highly reflective aluminum sheets available under the product name MIRO-SUN® and manufactured by ALANOD Aluminium-Veredlung GmbH & Co. KG of Ennepetal, Germany. In other variations, elastically deformable mirrors may be made from other materials such as, for example, reflectively coated plastics and other reflective or reflectively coated metals. In some variations, elastically deformable materials may comprise a reflective film such as, for example, a reflective or reflectively coated polyethylene terephthalate (e.g., Mylar®) film supported by an elastically deformable substrate such as, for example, a plastic or an unpolished aluminum sheet or panel. In some variations the mirrors may have a thickness, for example, of about 0.3 mm to about 0.8 mm and may be, for example, about eight feet in length.

Elastically deformable mirrors that assume a substantially flat shape absent deforming forces may be conveniently stored and/or shipped as a stack of substantially flat mirrors. This may reduce the cost of storing or shipping the mirrors, as a stack of flat mirrors takes less space and may be more easily packaged than a corresponding number of curved mirrors.

The mirrors used in solar energy collectors disclosed herein need not be made from elastically deformable material as just described, however. Instead, mirrors may be preformed in the desired radiation concentrating shape prior to installation in the solar energy collector or formed into the desired shape by bending, for example, during installation. Also, in some variations mirrors may be supported in a desired shape by a supporting framework. Any suitable reflective material such as, for example, polished or coated metals or reflectively coated polymers or glasses may be used to make such mirrors. In addition, in some variations reflective films such as, for example, reflective or reflectively coated polyethylene terephthalate (e.g., Mylar®) films may be used to make mirrors. Generally, any suitable material may be used to make the mirrors used in any of the solar energy collectors disclosed herein.

Figure 3A:
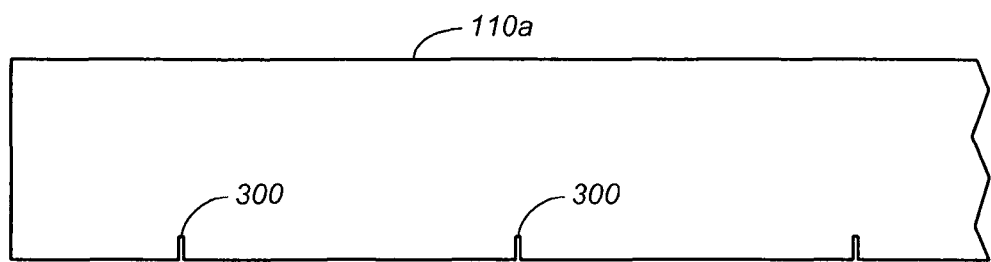
FIGS. 3A-3B show variations of mirrors including, respectively, slots and holes through which stanchion rods may engage a solar energy collector housing.
Figure 3B:
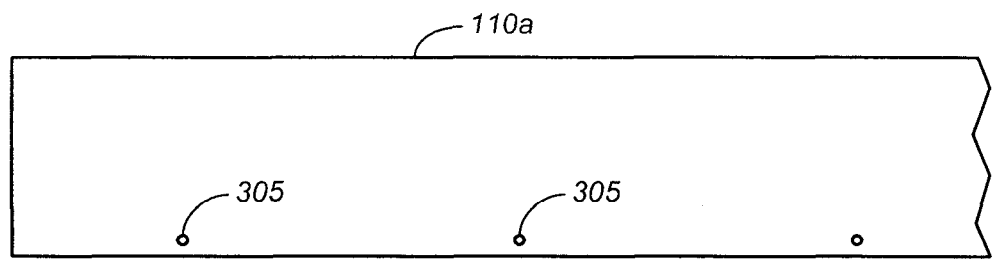

In some variations of the disclosed solar energy collectors, one or more of the mirrors may be easily removed for replacement, repair, or cleaning. For example, in solar energy collector 100 (FIG. 1A) upper mirrors 110c and 110d may be removed by removing (e.g., screw-down) restraining plates 142a or 142b from brackets 140a or 140b, respectively, and then withdrawing the upper edge of the mirror from respective upper bracket 155a or 155b. Lower mirrors 110a and 110b may be removed by removing (e.g., screw-down) restraining plates 143a or 143b from brackets 140a or 140b, and then withdrawing the lower edge of the mirror from base bracket 130. Referring to FIG. 3A, mirrors 110a and 110b (not shown) may include slots 300 through which rods 175 of stanchion 170 (FIG. 1A) pass to engage a portion (e.g., base bracket 130) of housing 105. This design allows for removal of mirrors 110a and 110b from base bracket 130 with stanchion 170 in place. Alternatively (FIG. 3B), stanchion rods 175 may pass through holes 305 in mirrors 110a and 110b (not shown) to engage a portion (e.g., base bracket 130), of housing 105. This latter design may require disengagement of at least one of rods 175 from housing 105 for removal of mirror 110a or 110b.

As another example, in solar energy collector 200 (FIG. 2), either of mirrors 210a and 210b may be easily removed by flexing it to free an edge of the mirror from base bracket 230 or from the respective top bracket 255a or 255b, and then withdrawing the other edge of the mirror from its retaining bracket. Mirrors 210a and 210b may include slots similar to slots 300 (FIG. 3A) to allow removal of the mirrors with stanchion 170 in place. Alternatively, mirrors 210a and 210b may include holes similar to holes 305 to accommodate rods 175 of stanchion 170, in which case removal of a mirror requires disengagement of at least one of rods 175 from housing 205. In variations in which solar energy collector 100 does not include ribs 145a-145d or includes only some of ribs 145a-145d (see below) one or more of mirrors 110a or 110b may be easily removed by flexing the mirror or mirrors as just described for mirrors 210a and 210b.

As shown in FIG. 1A and described above, mirrors 110a-110d in solar energy collector 100 are coupled to housing 105 by brackets (described in greater detail below) which also couple portions of housing 105 to each other and thus play dual structural roles in solar energy collector 100. In other variations of the disclosed solar energy collectors, however, mirrors may be coupled to the housing by brackets that attach to the housing but do not couple portions of the housing together. Also, in some variations mirrors may be attached to the housing or to other structural members (e.g., ribs 145a-145d), without use of brackets, by fasteners (e.g., screws, bolts, and rivets), adhesives, welding, or any other suitable attachment methods. Generally, any suitable attachment method may used to secure mirrors in the housings of any solar energy collector disclosed herein or variation thereof.

Housing and Panels

The housings of solar energy collectors as disclosed herein may have, for example, square, rectangular, trapezoidal, parabolic, partially circular, or u-shaped cross-sections. As noted above, the housing may have a trough-like shape, for example. Generally, any suitable housing shape may be used. Housings may be constructed, for example, from metals, plastics, wood, or any other suitable material.

In some variations, housings are constructed from panels coupled to each other with brackets. As described above, for example, housing 105 of solar energy collector 100 (FIGS. 1A-1D) is formed from four aluminum 1/16" thickness sheet panels 125a, 125b, 135a, and 135b coupled together by brackets 130, 140a, and 140b. In other variations, solar energy collector housings may be formed from more or fewer panels. For example, housing 205 of solar energy collector 200 (FIG. 2) is formed from two aluminum sheet panels (225a, 225b) coupled to each other by base bracket 230. Generally, the housings of solar energy collectors disclosed herein may comprise any suitable number of panels coupled to each other by brackets to form some or all of the housing.

In some variations, some or all of the panels from which a solar energy collector housing is constructed are substantially flat. For example, upper panels 135a and 135b of solar energy collector 100 are substantially flat. In other variations, not illustrated, all panels from which a housing is constructed are substantially flat. The flat panels in such a housing may be attached at angles to each other (with brackets, for example) to create corners as necessary to define a desired housing shape. Such flat panels may be easy to store, package, ship, and handle during assembly of a solar energy collector.

Figure 2:
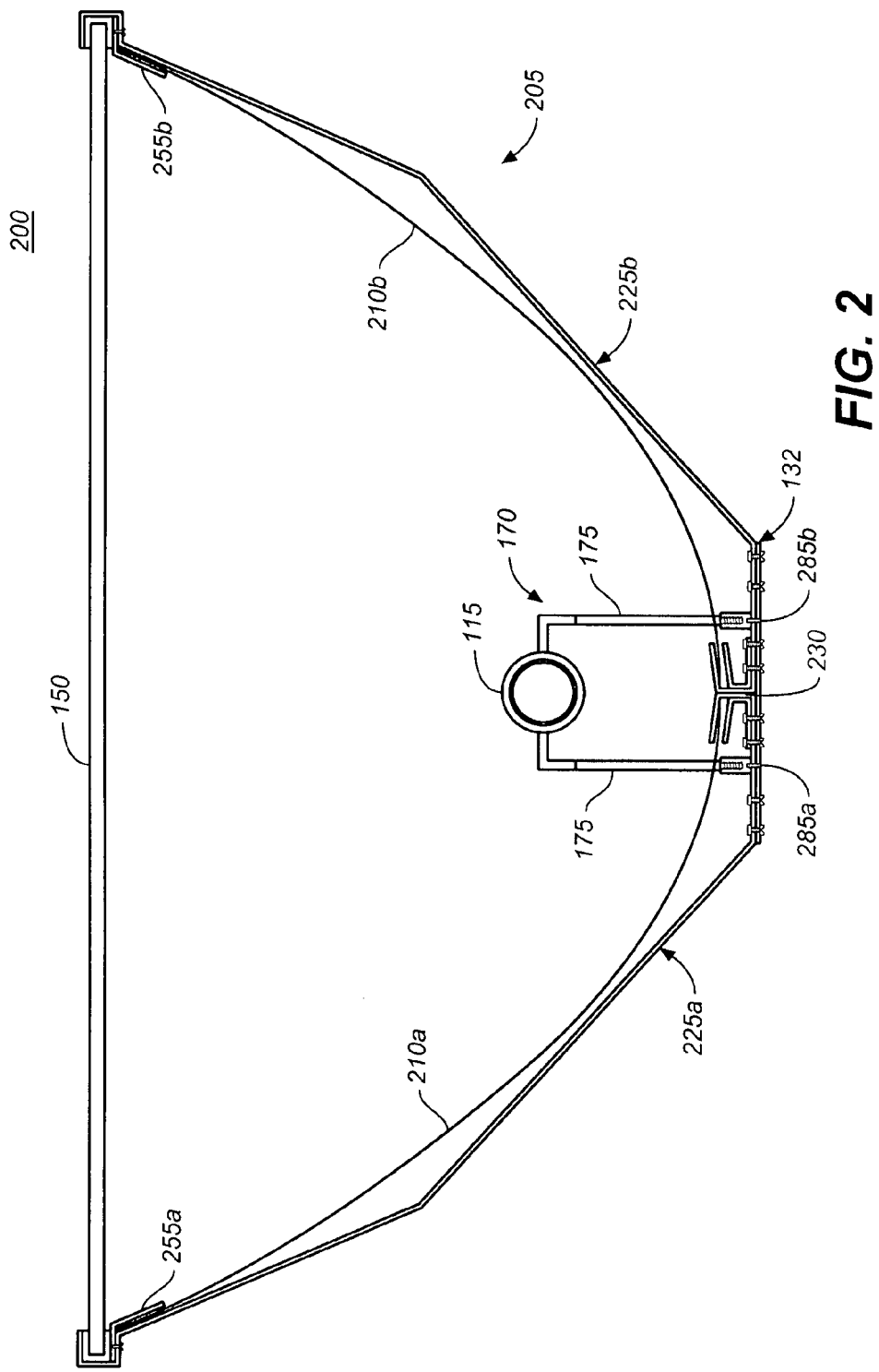
FIG. 2 shows a cross-sectional view of an example solar energy collector, according to one variation, that comprises two mirrors.

Housings of solar energy collectors as disclosed herein may also be constructed from curved or bent panels, or any suitable combination of flat, curved, and/or bent panels. Referring to FIG. 2, for example, in solar energy collector 200 panels 235a and 235b each include two bends defining substantially flat upper, middle, and bottom portions of housing 205. In solar energy collector 100 (FIG. 1A) lower panels 125a and 125b each include one bend defining substantially flat bottom and lower side portions of housing 105.

In some variations, housings include two or more identical or substantially identical panels. As noted above, for example, solar energy collector 100 (FIG. 1A) comprises pairs of identical or substantially identical panels. Similarly, panels 225a and 225b of solar energy collector 200 (FIG. 2) are identical or substantially identical. The use of sets of identical or substantially identical panels may, for example, simplify manufacturing, assembly, and repair of a solar energy collector. The use of two or more identical or substantially identical panels is not required, however.

Although in the examples described above the housing panels are made from aluminum sheets, housing panels used in any solar energy collector disclosed herein may be made from any suitable material. Suitable materials included, but are not limited to, metals, plastics including impact resistant plastics, and wood.

The housings of solar energy collectors disclosed herein need not include panels coupled to each other by brackets. In some variations panels may be coupled directly to each other by, for example, welding or with fasteners such as screws, bolts, or rivets. In addition, some or all of the housing may be molded or cast from, for example, metals or (e.g., impact resistant) polymers. Housings may also comprise a cast or molded portion (e.g., a bottom portion) to which panels are coupled by brackets or other methods.

Base Brackets, Stanchions, and Base Plates

In the example of FIG. 1A-1D, solar energy collector 100 comprises a base bracket 130 that couples lower panels 125a and 125b to each other to form a bottom portion of housing 105, secures lower edges of mirrors 110a and 110b to housing 105, and secures rods 175 of stanchion 170 to housing 105. In the illustrated variation, ends of panels 125a and 125b are positioned in recessed (i.e., notched) portions of the bottom surface of base bracket 130 and are attached to the bottom surface of base bracket 130 by, respectively, fasteners 185a and 185b passing through the panels to engage the bottom of base bracket 130. The recesses or notches may aid in registering the panels in the proper positions with respect to base bracket 130. Such recesses or notches are optional, however.

An optional base plate 132 is secured to panels 125a and 125b by, respectively, fasteners 190a and 190b. Additional fasteners 195a and 195b pass through base plate 132 and through panels 125a and 125b, respectively, to engage the bottom of base bracket 130 to further secure the base plate, the panels, and the base bracket to each other. Optional base plate 132 provides additional structural support to the bottom portion of housing 105.

Fasteners 185a, 185b, 190a, 190b, 195a, and 195b may be, for example, screws, bolts, rivets, or any other suitable fastener. More or fewer of such fasteners than shown in FIGS. 1A and 1B may be used to couple the base bracket, panels, and optional base plate to each other.

Symmetrically placed angled slots 196 in upper side portions of base bracket 130 accept lower edges of mirrors 110a and 110b and, in cooperation with side brackets 140a and 140b, secure mirrors 110a and 110b to housing 105. Although slots 196 are shown angled upward, other orientations such as for example, slots oriented substantially parallel to the bottom of housing 105 may be used in other variations.

In the illustrated example, stanchion rods 175 pass through holes or slots in mirrors 110a and 110b, as described above in the discussion under the "mirrors" heading, to engage threaded ends of rods 175 with threaded holes 197 in base bracket 130. In other variations, stanchion rods 175 may be, for example, press fit into holes in base bracket 130, attached to base bracket 130 by fasteners passing through the bottom of base bracket 130 to engage the ends of stanchion rods 175, or welded to base bracket 130. Upper 198a and lower 198b stanchion brackets are clamped by fasteners (e.g., screws) 199 around heat collector 115 to secure heat collector 115 to stanchion 170.

Figure 1C:
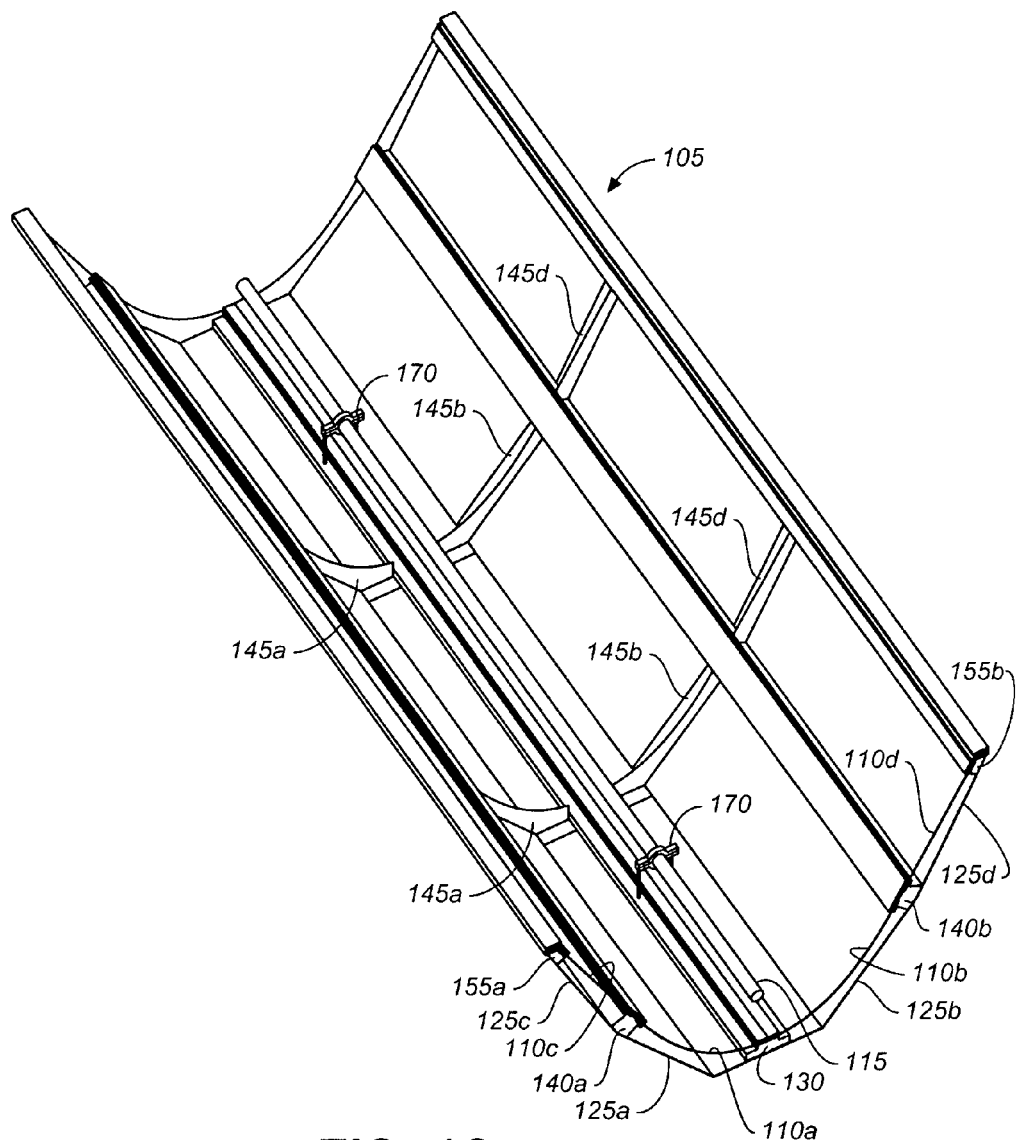
Figure 1D:
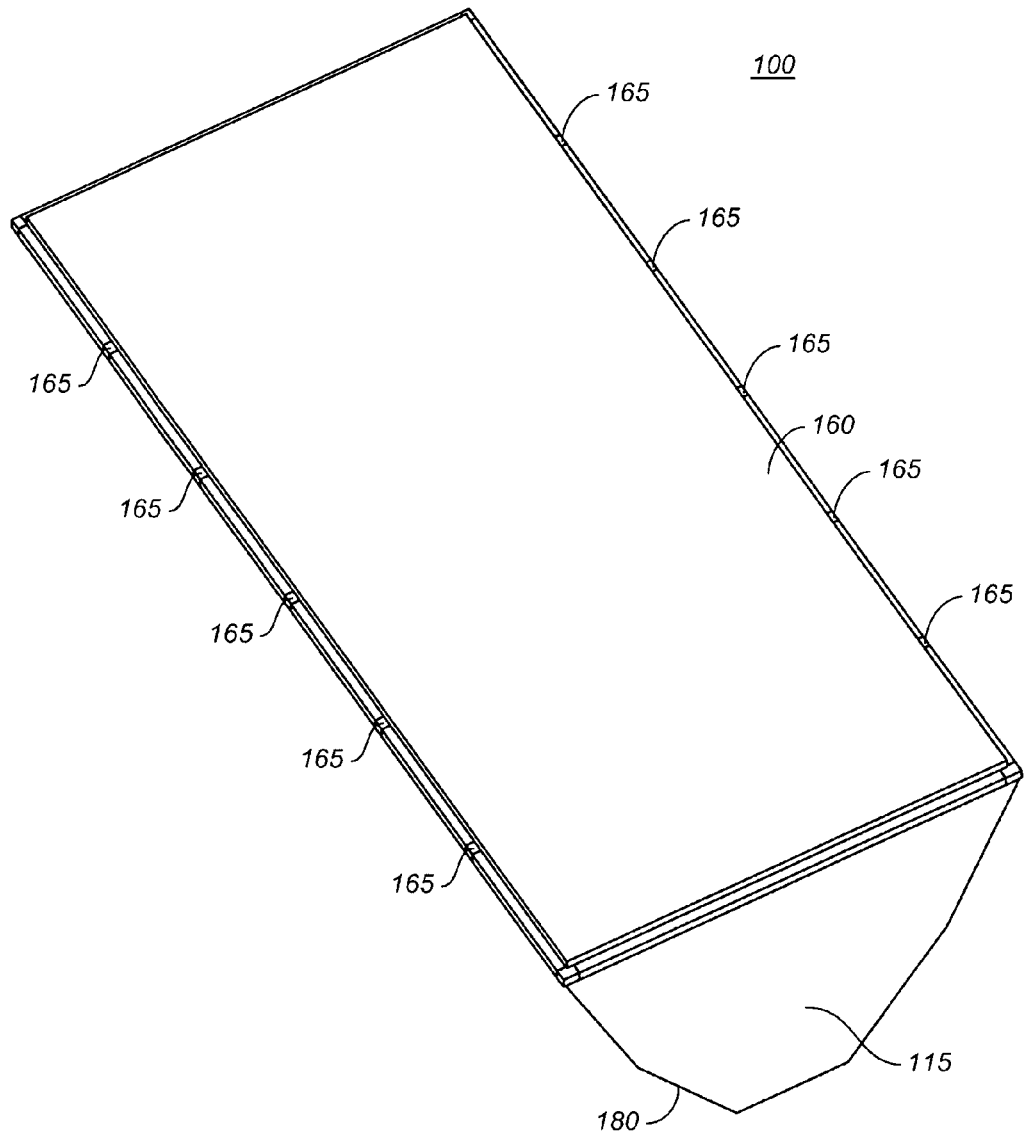

As shown in FIG. 1C, in the illustrated example base bracket 130 has the form of a rail that extends the length of solar energy collector 100. In other variations, however, a plurality of shorter base brackets 130 may be spaced along the length of the solar energy collector instead. Brackets having an extended rail form may, in some variations, be conveniently formed (at least in part) using an extrusion process. Also, brackets having an extended rail form may, in some variations, provide better sealed joints between components of housing 105 than would be provided by shorter brackets. Generally, the base brackets described herein may be implemented in variations having an extended rail-like form or in variations to be used as one or more shorter brackets.

Base brackets used in the solar energy collectors disclosed herein need not perform all of the duties performed by base bracket 130 (coupling panels, securing mirrors, securing heat collector stanchion). For example, base bracket 230 in solar energy collector 200 (FIG. 2) couples panels 225a and 225b together to form housing 205 and secures lower edges of mirrors 210a and 210b to housing 205 in a manner similar to base bracket 130. However, base bracket 230 does not secure rods 175 of stanchion 170 to housing 205. Instead, rods 175 are secured to housing 205 by fasteners 285a and 285b which pass through base plate 132 and panels 225a and 225b, respectively, but do not pass through or into base bracket 130. In other variations, a base bracket may couple panels together to form a portion of a housing and secure a stanchion to the housing, but not secure the mirrors.

Although stanchion 170 described above includes two rods 175 by which it is supported in and attached to a solar energy collector housing, in other variations a heat collector is supported by a stanchion attached to a base bracket via a single rod. Referring to FIG. 4, for example, another solar energy collector 400 comprises mirrors 410a and 410b positioned within a housing 405 to concentrate solar radiation on a heat collector 415 that is supported in housing 405 by a stanchion 470. Stanchion 470 is coupled to a base bracket 430 forming part of housing 405 by a single rod or leg 475.

Housing 405 comprises panels 425a and 425b coupled to each other by base bracket 430, which comprises separable upper (430U) and lower (430L) portions. Referring now to both FIG. 4 and FIG. 6, to assemble the lower portion of housing 405 the stanchion rod 475 is inserted into a through-hole 478 in (optional) collar portion 479 of upper bracket portion 430U. A threaded foot 480 is then inserted through the underside of upper bracket portion 430U to engage a threaded hole 485 in the bottom of stanchion rod 475. Panels 425a and 425b are positioned between the upper 430U and lower 430L bracket portion, and then upper 430U and lower 430L bracket portions are slid into position against each other and held in place by slidably interlocking features 485a and 485b on the upper and lower bracket portions, respectively. Optionally, fasteners (e.g., screws, bolts, rivets) passing through lower 430L bracket portion into upper bracket portion 430U may further secure the assembly.

In other variations, stanchion rod 475 may be, for example, press fit into a hole in base bracket 430 or welded to base bracket 430. Also, in other variations lower base bracket portion 430L may be attached to upper base bracket portion 430U with fasteners (e.g., screws, bolts, rivets) instead of by interlocking portions 485a and 485b.

Referring again to FIG. 4, mirrors 410a and 410b are secured in housing 405 by engaging their upper ends in, respectively, upper brackets 455a and 455b, and by engaging their lower ends in slots 496 in upper base bracket portion 430U.

Referring now to FIG. 5, another example solar energy collector 500 comprises four mirrors 510a-510d positioned within a housing 505 to concentrate solar radiation on a heat collector 415 that, as in solar energy collector 400, is supported by a stanchion 470 coupled to a base bracket 430 by a single rod or leg 475. Base bracket 430 couples lower panels 525a and 525b to each other to form a bottom portion of housing 505. Upper side portions of housing 505 are formed by upper panel 435a coupled by side bracket 540a to lower panel 525a, and by upper panel 435b coupled by side bracket 540b to lower panel 525b. Mirrors 510a and 510b are secured in housing 505 by engaging their lower ends in slots in base bracket 430 and engaging their upper ends in slots in, respectively, side brackets 540a and 540b. Mirrors 510c and 510d are secured in housing 505 by engaging their upper ends in, respectively, slots in upper brackets 555a and 555b and by engaging their lower ends in, respectively, slots in side brackets 540a and 540b.

Generally, any suitable base bracket disclosed herein may be used in any solar energy collector disclosed herein. In some variations, however, solar energy collectors as disclosed herein do not include a base bracket coupling panels together to form a bottom portion of a housing. In some variations lacking a base bracket the bottom portion (or more) of a housing is constructed by coupling panels directly to each other by, for example, welding or with fasteners such as screws, bolts, or rivets. In other variations lacking a base bracket the bottom portion (or more) of a housing is molded or cast from, for example, metals or (e.g., impact resistant) polymers.

Although the illustrated base brackets are shown using slots to secure mirror edges, in other variations base brackets may include clamps or clamping mechanisms to secure the mirror edges instead of or in addition to slots. Variations of base bracket 130 (FIG. 1A) may substitute clamps for slots 196. For example, the upper portion of base bracket 130 defining upper walls of slots 196 may be replaced with a screw-down or spring-loaded piece (e.g., plate) to form an upper jaw of a clamp that can be used to secure mirrors to the bracket. Variations of other base brackets disclosed herein may be similarly modified to use clamps or clamping mechanisms.

Side Brackets

In the example of FIGS. 1A-1D, solar energy collector 100 comprises identical or substantially identical side brackets 140a and 140b. Side bracket 140a couples panels 125a and 135b to each other to form a side portion of housing 105, and also secures edges of mirrors 110a and 110c to housing 105. Similarly, side bracket 140b couples panels 125b and 135b to each other to form another side portion of housing 105, and also secures edges of mirrors 110b and 110d to housing 105. In the illustrated example, ends of the panels are positioned in recessed (i.e., notched) portions of the outward facing surfaces of side brackets 140a and 140b and are attached to the outward facing surfaces of the side brackets by fasteners 144 passing through the panels to engage the side brackets. The recesses or notches aid in registering the panels in the proper positions with respect to the side brackets. Such recesses or notches are optional, however.

Fasteners 144 may be, for example, screws, bolts, rivets, or any other suitable fastener. More or fewer of such fasteners than shown in FIGS. 1A-1D may be used to couple the panels to the side brackets.

Side brackets 140a and 140b also include symmetrically placed slots 146 that accept edges of mirrors 110a-110d and, in cooperation with base bracket 130 and upper brackets 155a and 155b secure the mirrors to housing 105. In the illustrated example, mirrors 110a-110d are secured in slots 146 by (e.g., screw-down) restraining plates 142a, 142b, 143a, and 143b, which form one wall of each slot and which may be loosened and/or removed to facilitate positioning of the mirrors in the brackets. In some variations, the depths of slots 146 may be chosen such that the (e.g., screw-down) restraining plates clamp the mirrors into place, in which case the side brackets may be viewed as comprising clamps rather than slots.

Other variations of side brackets may also be used. Referring to FIG. 7, for example, solar energy collector 700 is substantially identical to solar energy collector 100 except for the substitution of side brackets 740a and 740b for side brackets 140a and 140b (and also the absence of base plate 132). Side brackets 740a and 740b do not include loosenable or removable restraining plates.

Figure 8:
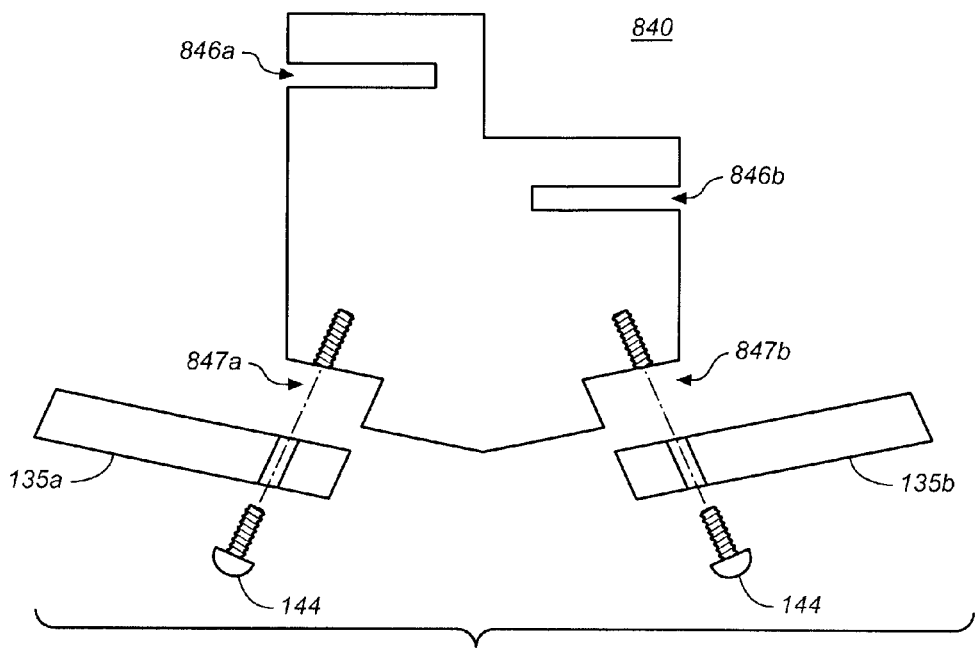
FIG. 8 shows a variation of a side bracket having slots for mirrors at different heights.

Slots in side brackets that accept and secure mirror edges need not be symmetrically positioned or positioned at the same height in the bracket. Referring to FIG. 8, for example, in some variations a side bracket 840 comprises a first slot 846a and a second slot 846b positioned at different heights. Such vertically off-set configurations of mirror slots allow a side bracket to secure mirrors forming, for example, two different parabolas (which may or may not share a focus). Side bracket 840 also includes recesses/notches 847a and 847b (similar to those in side brackets 140a, 140b) into which ends of panels 135a and 135b, respectively, are positioned. Fasteners 144 pass through panels 135a and 135b into side bracket 840 to secure the panels to the side bracket.

Figure 9A:
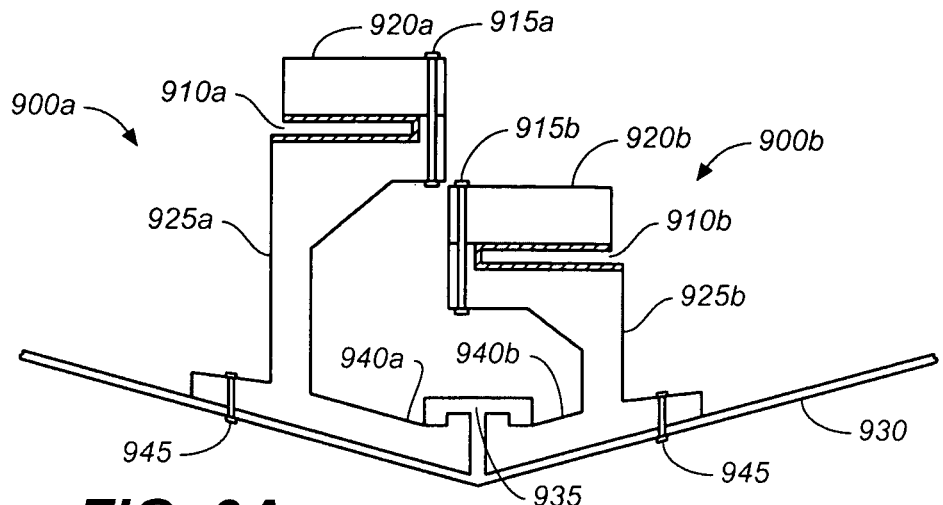
FIGS. 9A-9C show variations of side brackets having a single adjustable clamping slot for securing the end of a mirror.
Figure 9B:
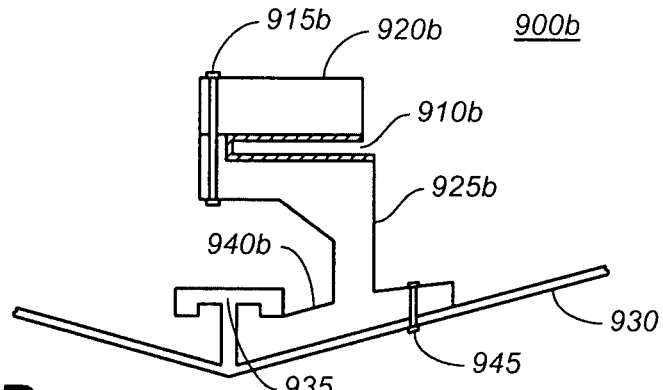
Figure 9C:
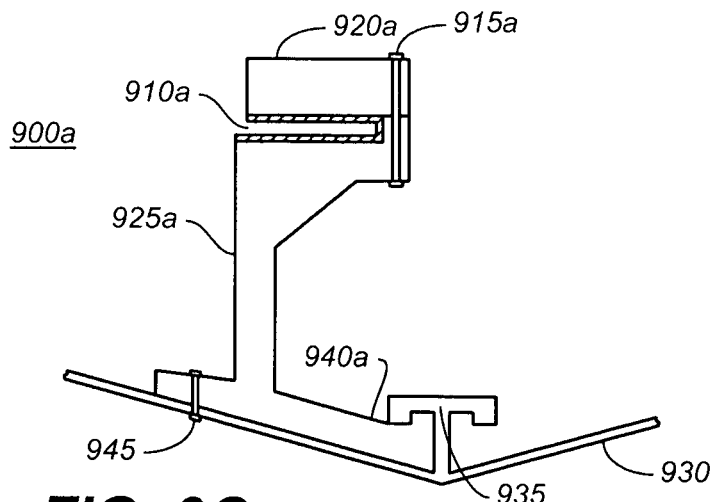

Referring to FIGS. 9A-9C, in some other variations side brackets 900a and 900b each have a single adjustable clamp or clamping slot 910a or 910b, respectively, for receiving and securing a mirror end. The width of the slots (clamps) may be adjusted using fasteners (e.g., screws) 915a or 915b to clamp upper jaw pieces 920a or 920b against lower jaw pieces 925a or 925b, respectively. The slot widths may be adjusted, for example, to clamp and thereby secure mirror ends in the slots and/or to flex or adjust the shape of the mirrors to better concentrate solar radiation on a heat collector. In some variations, the upper jaw portions may be removed or pivoted to the side to allow mirror ends to be easily inserted or removed from the slots. In other variations, clamping slots 910a an 910b may be, for example, spring-loaded to clamp mirrors into place rather than (or in addition to) being adjustable with screws or other fasteners.

In the example of FIGS. 9A-9C, side brackets 900a and 900b do not couple panels together to form a portion of a housing. Instead, both brackets are attached to a single bent panel 930 which forms a side portion of a housing. Panel 930 includes at its bend a t-shaped rail 935 into which foot portions 940a and 940b of brackets 900a and 900b, respectively, may be inserted (by sliding, for example). The brackets may be further secured to the panel using fasteners 945, which may be screws, bolts, rivets, or any other appropriate fastener.

Side brackets 900a and 900b can be separately removed from panel 935 and replaced. As shown, brackets 900a and 900b may be chosen to position their slots at different heights. Alternatively, the brackets may be chosen to position their slots at the same height.

In some variations, side bracket heights may be varied to allow a single standardized housing size and shape to support a variety of mirror configurations or shapes. Referring to FIG. 5, for example, side brackets 540a and 540b have a height that substantially off-sets mirrors 510a-510d from side portions of housing 505 and results in the four mirrors defining a reflective surface of a particular shape. The shape of the surface defined by the mirrors can be altered by replacing side brackets 540a and 540b with similar side brackets of a different height. Such a substitution could be used, for example, to focus or defocus the mirrors on the heat collector 415 as desired to affect the temperature to which the heat collector heats a working fluid. To facilitate such a substitution, side brackets 540a and 540b may be attached to panels with, for example, conventional easily removable fasteners such as screws and bolts.

Figure 10:
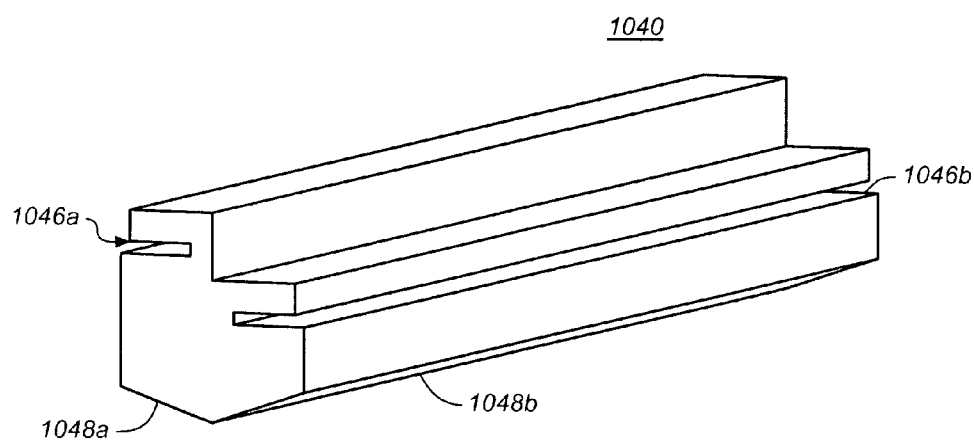
FIG. 10 shows a rail-type variation of a side bracket.

Side brackets may have an extended rail-like form. For example, side brackets 140a and 140b shown in FIG. 1C have the form of rails that extend the length of solar energy collector 100. Side bracket 1040 shown in FIG. 10 also has an extended rail-like form. In other variations, a plurality of shorter side brackets may be spaced along the length of the solar energy collector in place of an extended rail-type side bracket. Side brackets having an extended rail form may, in some variations, be conveniently formed, in part, using an extrusion process. Also, side brackets having an extended rail form may, in some variations, provide better sealed joints between components of a housing than would be provided by shorter brackets. Generally, the side brackets described herein may be implemented in variations having an extended rail-like form or in variations to be used as one or more shorter brackets.

Referring again to FIG. 10, although mirror slots 1046a and 1046b in side bracket 1040 are shown to be at different heights, in other variations the slot heights may be the same. Side bracket 1040 can be used to couple two panels together to form a portion of a housing by, for example, attaching one panel to bottom surface 1048a and the other panel to bottom surface 1048b using conventional fasteners, adhesives, or welding, for example. Alternatively, side bracket 1040 can be positioned in the bend of a single bent panel portion of a housing and attached to the panel by any of the same means.

Many of the example side brackets described above were shown or described as coupling panels together to form a portion of a solar energy collector housing. Generally, however, the side brackets described herein may also be implemented in variations that will attach to a single panel (which might be bent, flat, or curved, for example) to secure mirrors to a housing without necessarily also coupling panels together. Alternatively, in some variations side brackets couple panels together to form a portion of a housing but do not secure mirrors to the housing.

Although some variations of the solar energy collectors disclosed herein utilize a plurality of identical or substantially identical side brackets, the use of identical or substantially identical side brackets is not required.

Although several of the illustrated side brackets are shown using slots to secure mirror edges, other variations of such side brackets may include clamps or clamping mechanisms (e.g., as described above for several clamping variations) to secure the mirror edges instead of or in addition to slots.

Generally, any suitable side bracket disclosed herein may be used in any solar energy collector disclosed herein. In some variations, however, solar energy collectors as disclosed herein do not include a side bracket coupling panels together or securing mirrors. Solar energy collector 200 (FIG. 2), for example, does not employ side brackets.

Upper Brackets

In solar energy collector 100 (FIGS. 1A-1D), upper bracket 155a comprises a first slot for receiving and securing the upper end of mirror 110c and a second slot for receiving and securing an edge of transparent cover 150. These slots are arranged at an acute angle with respect to each other. Upper bracket 155a may be attached to panel 135a by conventional fasteners (e.g., screws, bolts, rivets), as shown, or in other variations by welding, gluing, or any other suitable attachment method. In some variations, the end of panel 135a that is attached to upper bracket 155a is positioned in a recessed (i.e., notched) portion of the outward facing surface of upper bracket 155a. In the illustrated variations, a portion of upper bracket 155a around the second slot protrudes transversely away from panel 135a and housing 105 to provide a seat for storm cover clip 165.

The structure of upper bracket 155a enables it to couple mirror 110c, panel 135a of housing 105, transparent cover 150, and (optionally) storm cover 160 to each other. Upper bracket 155b is similarly, identically, or substantially identically constructed to enable it to couple mirror 110d, panel 135b, transparent cover 150, and (optionally) storm cover 160 to each other.

As shown in FIG. 1C, in the illustrated variation upper brackets 155a and 155b have the form of rails that extend the length of solar energy collector 100. In other variations, however, a plurality of shorter upper brackets 155a and 155b may be spaced along the length of the solar energy collector instead. Upper brackets having an extended rail form may, in some variations, be conveniently formed, in part, using an extrusion process. Also, upper brackets having an extended rail form may, in some variations, provide better sealed joints between components of a housing than would be provided by shorter brackets. Generally, the upper brackets described herein may be implemented in variations having an extended rail-like form or in variations to be used as one or more shorter brackets.

Upper bracket 455a in solar energy collector 400 (FIG. 4) also comprises a first slot for receiving and securing the upper end of a mirror (410a) and a second slot for receiving and securing an edge of transparent cover 150, with the first and the second slots arranged at an acute angle with respect to each other. Upper bracket 455a also includes a third slot substantially parallel to the second slot and opening away from the housing. The third slot, or the portion of the upper bracket forming its lower wall, may provide a seat for a storm cover clip to clamp a storm cover over transparent cover 150. Upper bracket 455a may be attached to an upper horizontal portion of panel 425a by, for example, conventional fasteners (e.g., screws, bolts, rivets), or by welding, gluing, or any other suitable attachment method.

The structure of upper bracket 455a enables it to couple mirror 410a, panel 425a, transparent cover 150, and (optionally) a storm cover to each other. Upper bracket 455b is similarly, identically, or substantially identically constructed to enable it to couple mirror 410b, panel 425b, transparent cover 150, and (optionally) a storm cover to each other.

Although upper brackets 155a, 155b, 455a, and 455b, each perform multiple functions (coupling to housing, mirror, and transparent cover), it is not necessary that all of these functions be performed by a single upper bracket. Referring to FIG. 2, for example, in solar energy collector 200 the upper end of panel 225a is folded to form a horizontal slot for receiving an edge of transparent cover 150 and securing it to housing 205. Upper bracket 255a has the form of a sheet or plate bent at an obtuse angle to form a first substantially flat portion, which is inserted into the slot formed by the folded upper end of panel 225a, and a second substantially flat portion that forms with panel 225a a slot for securing an upper end of mirror 210a. The portion of upper bracket 255a that is inserted into the slot formed by the folded upper end of panel 225a may be secured to panel 225a by, for example, conventional fasteners (e.g., screws, bolts, rivets) or by welding, gluing, or any other suitable attachment method.

Although the illustrated upper brackets are shown as using slots to secure mirror edges, in other variations upper brackets may include clamps or clamping mechanisms to secure the mirror edges instead of or in addition to slots. Variations of upper brackets 155a and 155b (FIG. 1A) may substitute clamps for the slots receiving mirrors 110c and 110d. For example, the thin portion of upper bracket 155a defining one wall of the mirror slot may be replaced with a screw-down or spring-loaded piece (e.g., plate) to form a clamping jaw that can be used to secure mirrors to the bracket. Variations of other upper brackets disclosed herein may be similarly modified to use clamps or clamping mechanisms.

Although in the illustrated examples pairs of upper brackets have been identical or substantially identical, that is not required. Generally, any suitable upper bracket disclosed herein or variation thereof may be used in any solar energy collector disclosed herein. In some variations, transparent covers and mirrors may be secured in solar energy collectors without use of such upper brackets, however, and hence upper brackets are not used.

Ribs

Solar energy collector 100 (FIGS. 1A-1D) comprises a plurality of ribs 145a-145d shaped to support mirrors 110a-110d in a desired (e.g., parabolic) shape. Ribs 145a-145d may also provide additional structural strength to housing 105. Ribs 145a-145d may be attached to housing panels 125a, 125b, 135a, and 135b, respectively with, for example, conventional fasteners (e.g., screws, bolts, rivets) or by adhesives, welding, or any other suitable attachment method. The ends of ribs 145a-145d may contact and be shaped to fit and engage the (e.g., notched) sides of the upper, side, or bottom brackets. In some variations, the ribs are attached to brackets they contact by, for example, conventional fasteners or by any other suitable attachment methods described herein or known to one of ordinary skill in the art.

In one variation, the ribs are made (e.g., cut or stamped) from aluminum sheet having a thickness of about 1.6 mm. Any other suitable materials and thicknesses may also be used, however. Ribs may be made, in some variations, for example, from other metals, plastics, or wood.

Referring to FIG. 1C, solar energy collector 100 comprises two identical or substantially identical sets of ribs 145a-145d spaced along the length of the collector, which in the illustrated variation is about eight feet. Any suitable spacing between sets of ribs may be used, however.

Figure 11:
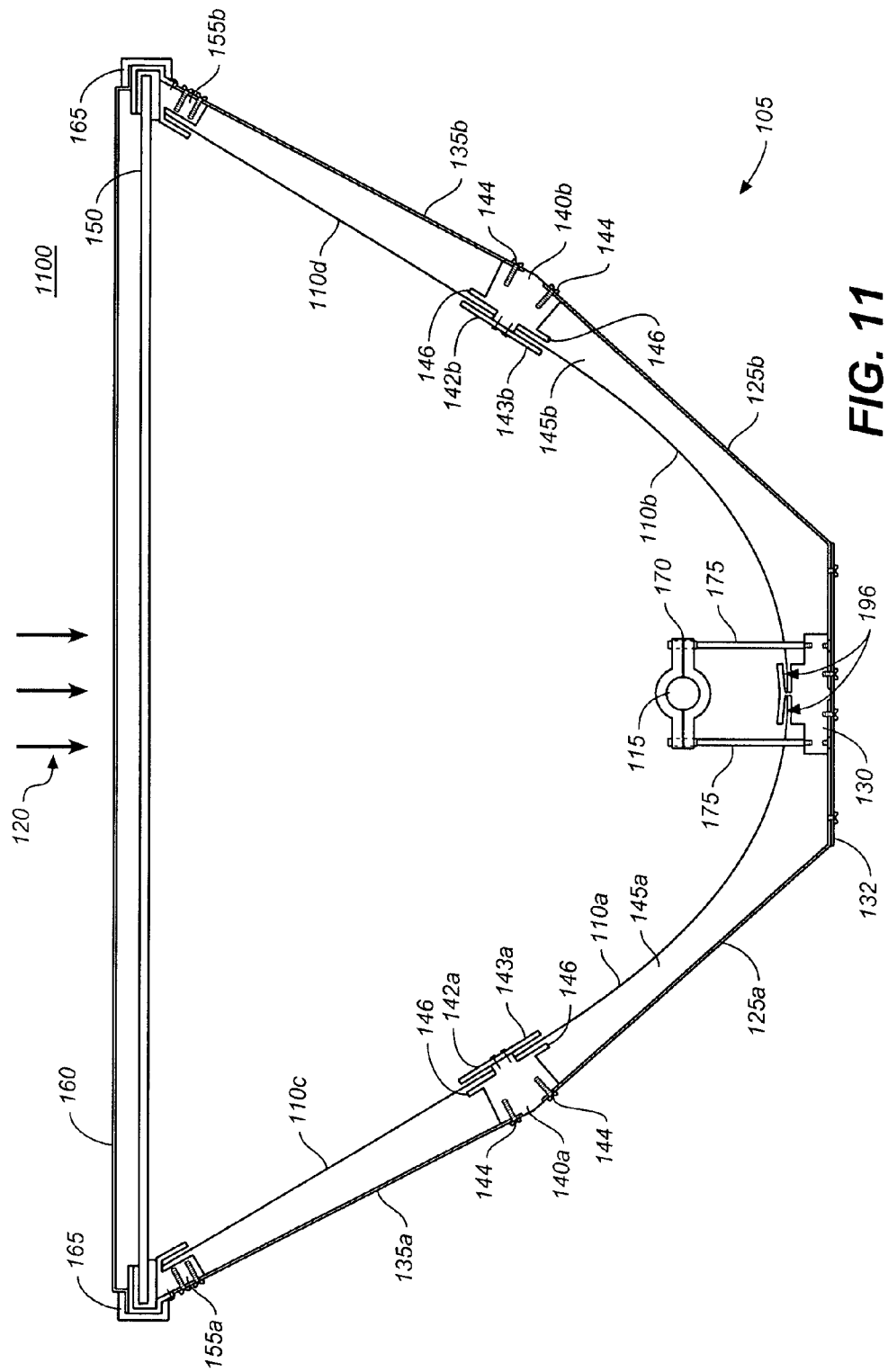
FIG. 11 shows an example solar energy collector, according to one variation, that differs from that shown in FIGS. 1A-1D by the absence of upper ribs.

Although solar energy collector 100 comprises one or more sets of four ribs 145a-145d, the use of such ribs in solar energy collectors as disclosed herein is optional and more or fewer such ribs per set may be used. Referring to FIG. 11, for example, solar energy collector 1100 is substantially identical to solar energy collector 100, except solar energy collector 1100 includes only lower ribs 145a and 145b and does not include upper ribs 145c and 145d. As additional examples, the illustrated variations of solar energy collectors 200 (FIG. 2), 400 (FIG. 4), and 500 (FIG. 5) do not include ribs.

In other variations, though, solar energy collectors 200, 400, 500, and other solar energy collectors disclosed herein may include any suitable number and configuration of ribs supporting mirrors and/or providing additional structural strength to the collector.

In some variations, solar energy collectors without housings comprise brackets (or rails) and ribs as disclosed herein (or suitable variations thereof) arranged to form a framework supporting mirrors that concentrate solar radiation on a heat collector. Referring to FIGS. 1A-1D, for example, in some variations a solar energy collector is substantially identical to solar energy collector 100 except for the absence of panels 125a, 125b, 135a, and 135b. In such variations, ribs 145a-145d may be attached to bottom, side, and top brackets they contact by, for example, conventional fasteners or by any other suitable attachment methods as described herein or known to one of ordinary skill in the art. Such variations may optionally include transparent cover 150 and/or removable storm cover 160. Similar modifications may be made to other solar energy collectors described herein to provide solar energy collectors, with or without housings, that comprise brackets and ribs (or rails) arranged to form a framework supporting mirrors that concentrate solar radiation on a heat collector.

Heat Collector

Heat collector 115 in solar energy collector 100 (FIGS. 1A-1D) is, in one variation, a stainless steel or copper tube or pipe located approximately coincident with the line focus of parabolic mirrors 110a-110d, extending the length of solar energy collector 100, and having an inner diameter of about 0.65" to about 0.87" and an outer diameter of about 0.75" to about 1.0." Heat collector 115 may, in some variations, be coated with a coating (e.g., a paint) that promotes absorption of solar radiation incident on heat collector 115. In some variations, heat collector 115 is coated with POR-20 black velvet heat resistant paint available from POR-15, Inc., Morristown N.J. to promote absorption of solar radiation. In another variation, heat collector 115 is coated with Sherwin Williams Flame Control SW-B68-B-A2 black paint available from Sherwin Williams Company. Any other suitable coating may also be used.

Where multiple solar energy collectors are ganged into sections or extended rows (see below), in some variations their heat collectors may be joined in series to provide a single long effective heat collector. In other variations, a single continuous heat collector (e.g., tube or pipe) may pass through an entire section or row.

A working (e.g., heat transfer) fluid flows through and is heated by heat collector 115. The working fluid may be, for example, water, an oil, glycol, or any other suitable heat transfer fluid. In some variations the working fluid may be a Therminol® heat transfer fluid available from Solutia, Inc. In other variations the working fluid may be an Xceltherm® heat transfer fluid available from Radco Industries, Inc. The heated working fluid may be used directly to supply heat for an application or, for example, as a working fluid used to drive a turbine for power generation. Alternatively, the working fluid may function as a heat transfer fluid that transfers heat collected in solar energy collector 100 to another working fluid which is subsequently used in an application.

Where the working fluid is an oil, in some variations it may reach temperatures of about 200° F. to about 550° F. after passing through one or more solar energy collectors.

In some variations the internal surfaces of heat collector 115 are rifled or include protuberances, vanes, or other flow disturbing features that promote mixing of and/or convective heat transfer in the working fluid as it passes through heat collector 115. Such flow disturbing features may be particularly advantageous where the working fluid is a viscous fluid (e.g., a viscous oil) that would otherwise tend to move as a substantially laminar flow through heat collector 115.

Although in the illustrated variations heat collector 115 has a tubular structure, other heat collector configurations known to one of ordinary skill in the art or variations thereof may also be used in the solar energy collectors disclosed herein. For example, heat collector 115 may comprise multiple tubes through which working fluid passes. Also, in some variations heat collector 115 may be enclosed in a transparent (e.g., glass) envelope to provide an insulating layer to reduce thermal losses from heat collector 115. The transparent envelope may contain air, other gases, or be evacuated or partially evacuated in some variations.

Transparent Cover

Solar energy collectors as disclosed herein may include in some variations a transparent cover such as transparent cover 150 shown in various figures. As noted earlier in this detailed description, transparent cover 150 and variations thereof may help protect mirrors, heat collectors, and other components of a solar energy collector from adverse environmental conditions. In combination with a sealed or partially sealed housing, for example, transparent cover 150 may help protect such components from corrosion. The use of such transparent covers in variations of solar energy collector 100 (FIGS. 1A-1D) and variations of other solar energy collectors disclosed herein is optional, however.

Transparent cover 150 is made from glass in some variations. In other variations transparent cover 150 is made from Lexan plastic available from General Electric Company. Generally, transparent cover 150 and variations thereof may be made, for example, from glass, plastics, or any suitable material that is substantially transparent to solar radiations. In some variations, transparent cover 150 has the form of a lens (e.g., a Fresnel lens) that further optimizes the collection of solar radiation by the heat collector.

Transparent covers such as transparent cover 150 may be attached to solar energy collectors disclosed herein using, for example, the various bracket and rail structures for that purpose shown and described herein. Alternative attachment methods may also be used, however. For example, transparent covers may be bonded (e.g., glued) to a housing or framework of a solar energy collector, cast as a part thereof, or attached using any suitable fasteners including conventional screws, bolts, and rivets.

Gaskets: Sealing, Vibration Damping, Prevention of Corrosion

Gasket-like material such as neoprene rubber, for example, may be used at various locations in variations of the solar energy collectors disclosed herein. Referring to FIG. 1A, for example, in some variations gasket material may be provided between transparent cover 150 and inner surfaces of the slot in upper brackets 155a and 155b into which edges of transparent cover 150 fit in order to form a better seal. Similarly, in some variations, to provide better seals, gasket material may be provided between base plate 132 and panels 125a and 125b, between base bracket 130 and panels 125a and 125b, between the various panels and the surfaces of side brackets 140a and 140b to which they are attached, and/or between panels 135a and 135b and surfaces of upper brackets 155a and 155 to which they attach. In addition, gasket material may be provided in the various bracket slots that receive and secure the edges of mirrors 111a-110d in order to damp vibrations of the mirrors. The provision of gasket material at these various locations may also prevent contact between dissimilar materials that could result in corrosion.

Gasket-like or similarly suitable material may be provided in other solar energy collectors disclosed herein at locations corresponding to or similar to those described with respect to solar energy collector 100, as well as at any other suitable location. The use of such gasket-like materials is not required, however.

Storm Cover

Solar energy collectors as disclosed herein may include in some variations a removable impact resistant storm cover such as storm cover 160 shown in various figures. As explained above, storm cover 160 is removed during operation but may be installed to protect components of a solar energy collector from storms or other inclement weather. The use of storm covers is not required with solar energy collectors disclosed herein, however.

Storm covers such as storm cover 160 may be made, for example, from aluminum sheet, from impact resistant plastic, or from any other suitable material. Storm covers may be sized, for example, to fit an individual solar energy collector. Where several (e.g., 2, 3) solar energy collectors are joined together to form a section, in some variations the storm cover is sized to fit the entire section. In other variations, such a joined section may be covered using two or more separate storm covers or a multi-piece storm cover. For example, a section of three solar energy collectors may be covered, in some variations, using three storm covers (or a storm cover having three pieces) each the length of a single solar energy collector.

Figure 12:
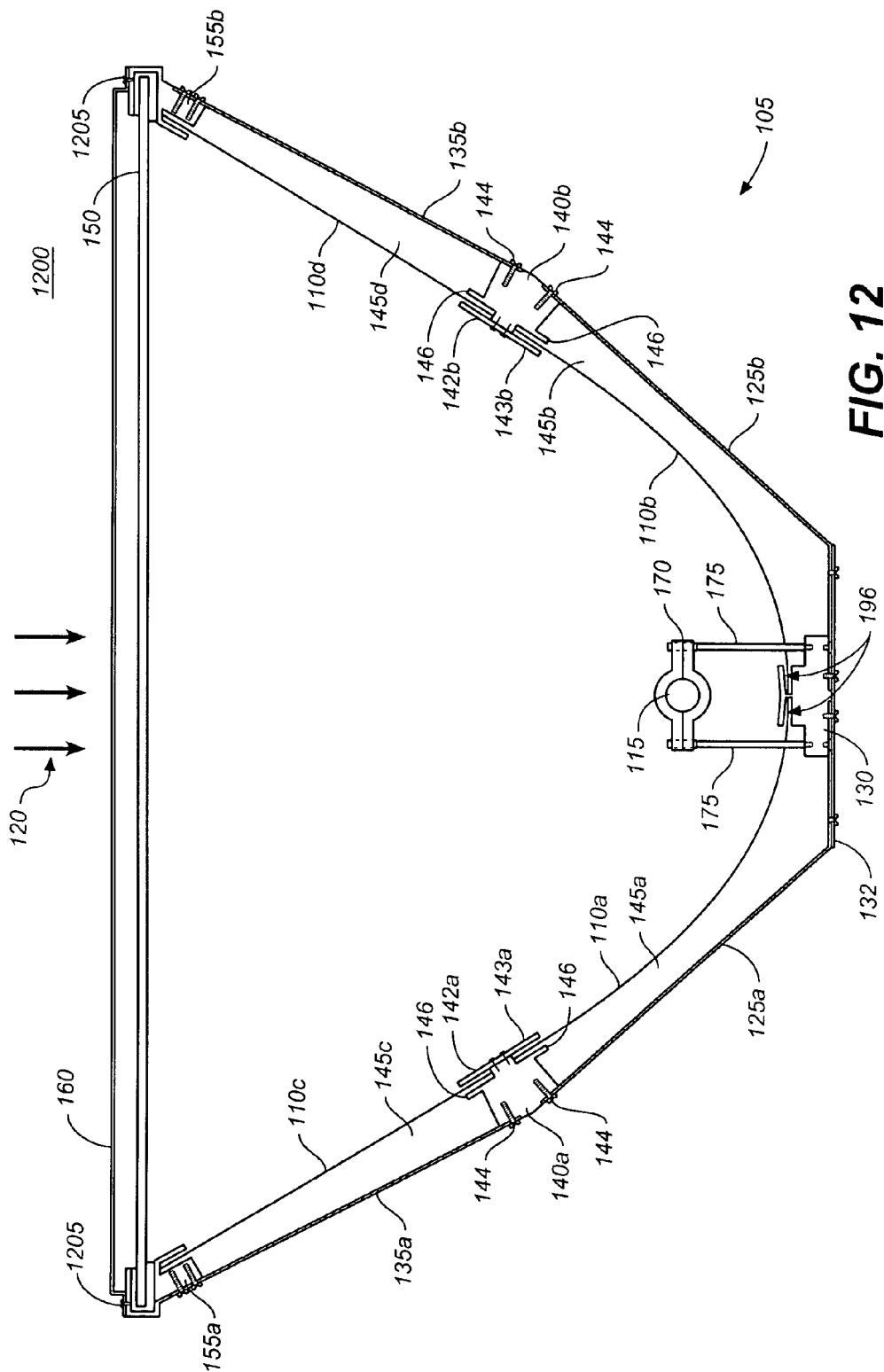
FIG. 12 shows an example solar energy collector, according to one variation, that differs from that show in FIGS. 1A-1D by having an optional screw-down storm cover.

Storm covers may be attached to solar energy collectors by any suitable method. In variations shown in several of the figures, a storm cover is attached to a solar energy collector by C-shaped clips 165 which engage a top surface of the storm cover and also engage a portion of the solar energy collector housing (e.g., a surface on an upper bracket as described above and shown in various figures) to clamp the storm cover to the housing. The use of such clips may allow easy and rapid installation of the storm covers. Clips having other shapes may also be used in some variations. In some variations Z-shaped clips may be used. Such Z-shaped clips may secure a storm cover to a collector in a similar manner to C-shaped clips, and in addition provide a lever-arm (bottom of the Z) which may be used to easily disengage the clip. In another variation, shown in FIG. 12, a storm cover 160 is attached to a housing 105 via suitable fasteners (e.g., screws or bolts) that pass through the storm cover to engage portions of upper brackets 155a and 155b. In yet other variations, storm covers may be attached to solar energy collectors using snaps, hook and eye connectors, wire, or cords.

Removable storm covers as describe herein, and variations thereof, may also be advantageously used with other solar energy collectors known to one of ordinary skill in the art. For example, storm covers may be installed over trough collectors, dish collectors, or the mirrors in mirror arrays to protect mirrors and other components from inclement weather.

Ganging

As noted earlier in this detailed description, in some variations individual solar energy collectors may joined together to form sections of two, three, or more solar energy collectors. The sections may then be coupled together to form rows. It is not required that the disclosed solar energy collectors be joined in this manner, however.

Figure 13A:
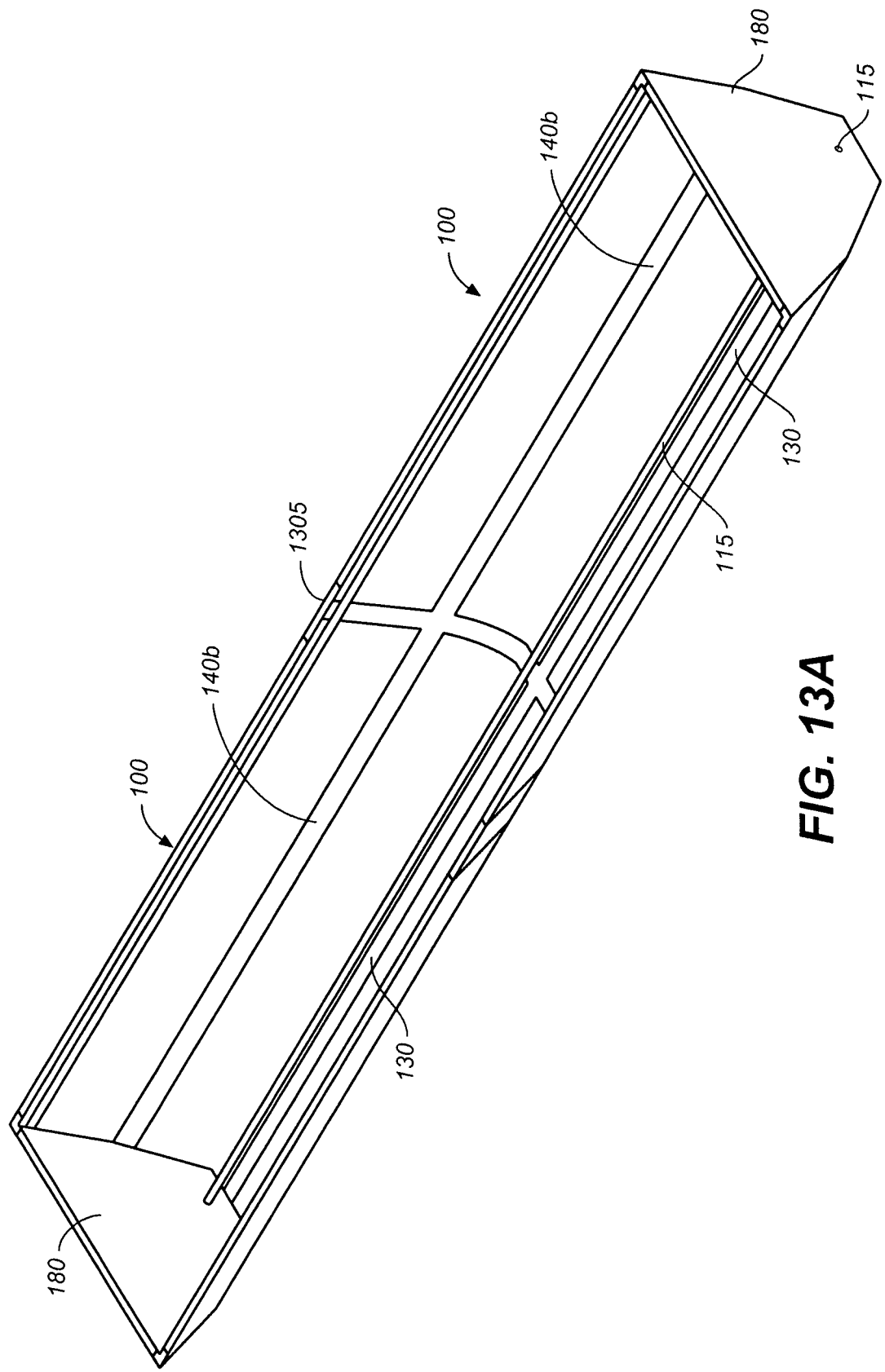
FIGS. 13A-13B show, respectively, two solar energy collectors joined together according to one variation and three solar energy collectors joined together according to another variation.
Figure 13B:
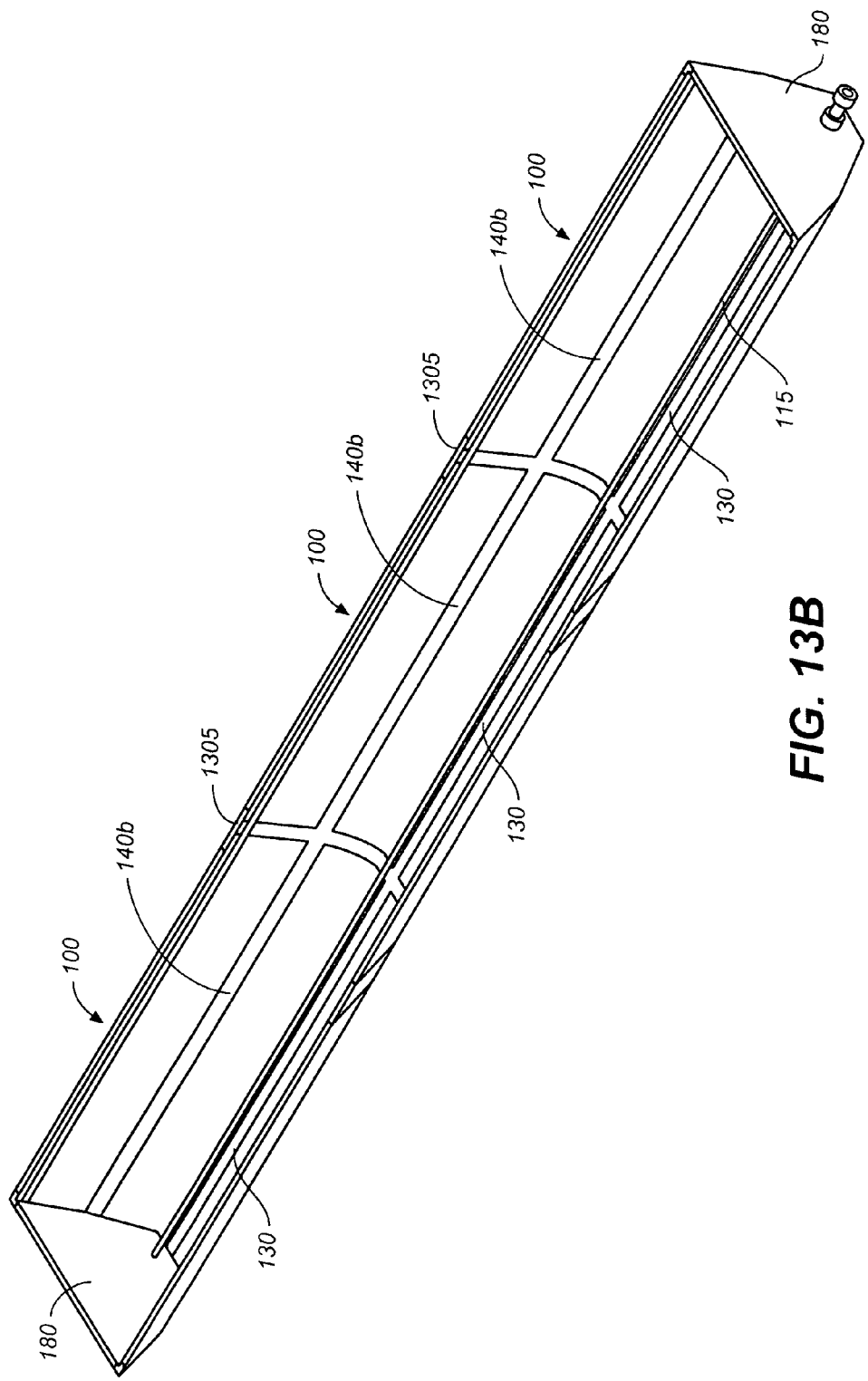

Referring to FIG. 13A, in some variations two solar energy collectors 100 are joined by a joiner 1305 to form a section. The ends of the section are formed by end caps 180, through which heat collector 115 either protrudes or may be accessed. FIG. 13B similarly shows three solar energy collectors 100 joined by two joiners 1305 to form a section. In the illustrated variations, joiner 1305 is a sheet metal bracket that hooks or otherwise engages upper edges of two collector housings at or near the joint between them and runs beneath the collectors to support the joint. In some variations joiner 1305 may be attached to the housings using conventional fasteners, for example.

Although the illustrated variations employ joiner 1305, any suitable flange, bracket, joiner, or joining method may be used to join the disclosed solar energy collectors together.

Mounting

In some variations, individual solar energy collectors and/or sections of joined solar energy collectors may be pivotably mounted so that, for example, they may track the sun or be oriented in an optimal stationary position for collecting solar radiation. The solar energy collectors may be, for example, ground mounted or mounted on building roof tops.

Referring to FIGS. 14A-14C, for example, in some variations a solar energy collector such as solar energy collector 100 (or a joined section of solar energy collectors) is pivotably mounted with pivot assembly 1400 supported by support stand 1415. In the illustrated variation, pivot assembly 1400 comprises flanges 1405 and bearing assembly 1410. Flanges 1405, which are pivotably coupled to bearing assembly 1410, attach to end caps 180 of the solar energy collectors. Heat collector tube 115, located in this variation on or approximately on the rotational axis of solar energy collector 100, passes through the centers of flanges 1405 and bearing assembly 1410 to run between the solar energy collectors coupled by pivot assembly 1400. In some variations, bearing assembly 1410 is a split assembly with a top portion that may be removed to allow the solar energy collectors to be mounted.

Figure 15A:
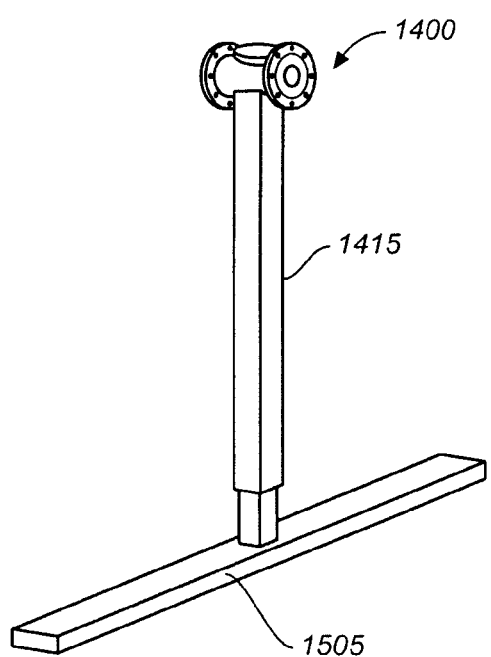
FIGS. 15A-15B show the use of interchangeable feet adapted for roof (or other hard surface) and ground mounting, respectively, according to one variation.
Figure 15B:
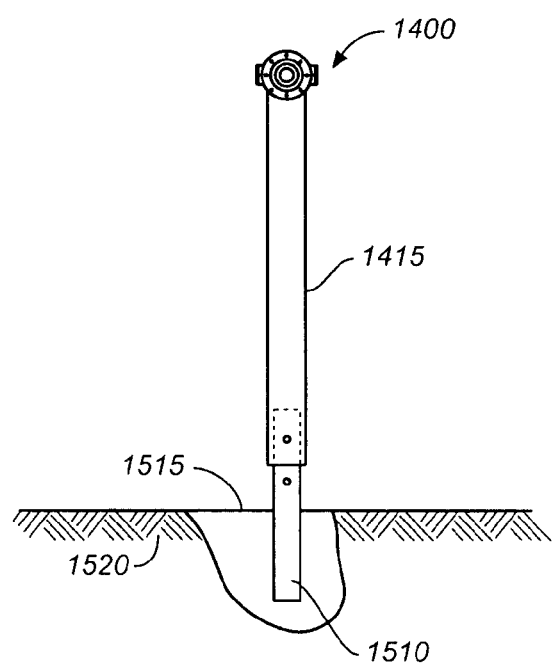
Figure 17B:
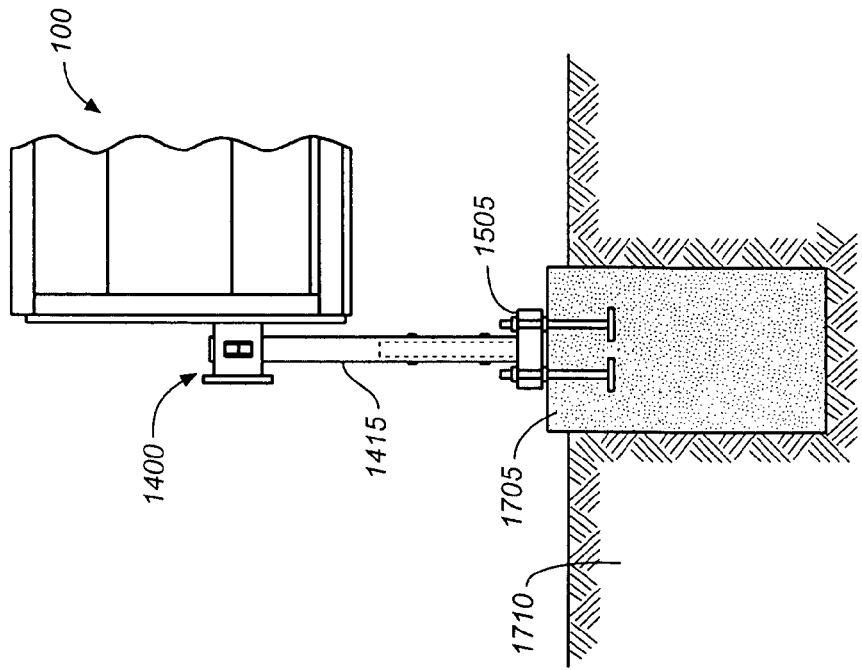
FIGS. 17A-17B show views of a solar energy collector mounted ground mounted according to one variation.
Figure 17A:
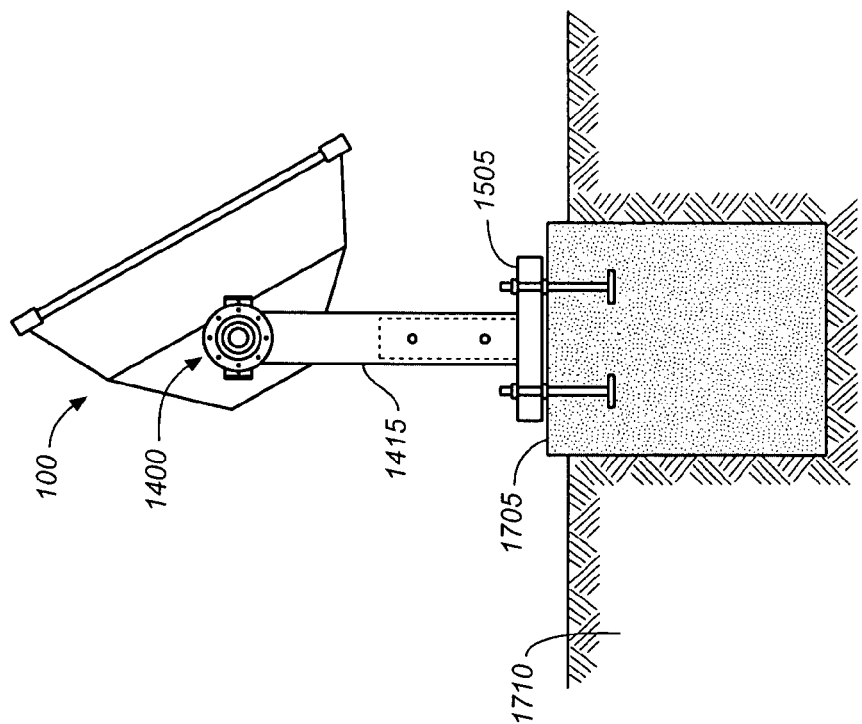

Referring now to FIGS. 15A-15B, in some variations support stand 1415 can interchangeably accept a foot 1505 adapted for mounting on a roof top or other hard and flat surface, or a foot 1510 more suitable for ground mounting. Transversally extended foot 1505 may be bolted to a roof or other hard surface, for example. Post-like foot 1510 may be, for example, secured in a hole 1515 in the ground 1520 using concrete, gravel, or any other suitable material. FIGS. 16A-16B show views of a solar energy collector mounted on a roof or other hard surface using foot 1505. FIGS. 17A-17B show views of a solar energy collector mounted with a foot 1505 to a (concrete or wood, for example) pier 1705 set in the ground 1710.

Figure 18:
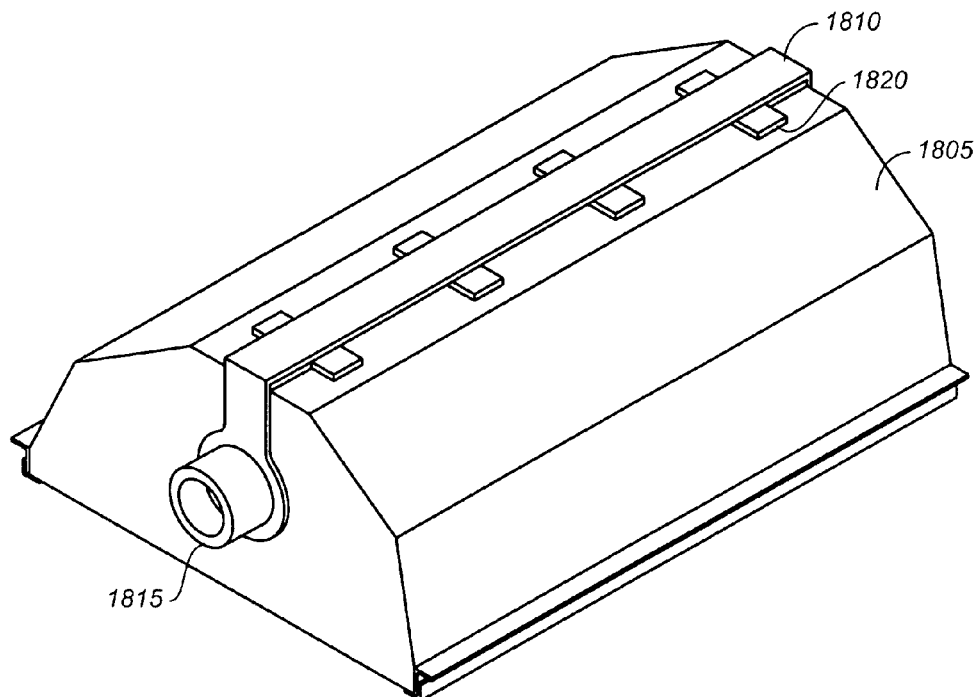
FIG. 18 shows a cradle mounted solar energy collector housing according to one variation.

Other methods of pivotably mounting solar energy collectors may also be used. For example, FIG. 18 shows a variation in which a support cradle 1810 connected to a mounting flange 18 runs the length of and supports the bottom of housing 1805.

Figure 19:
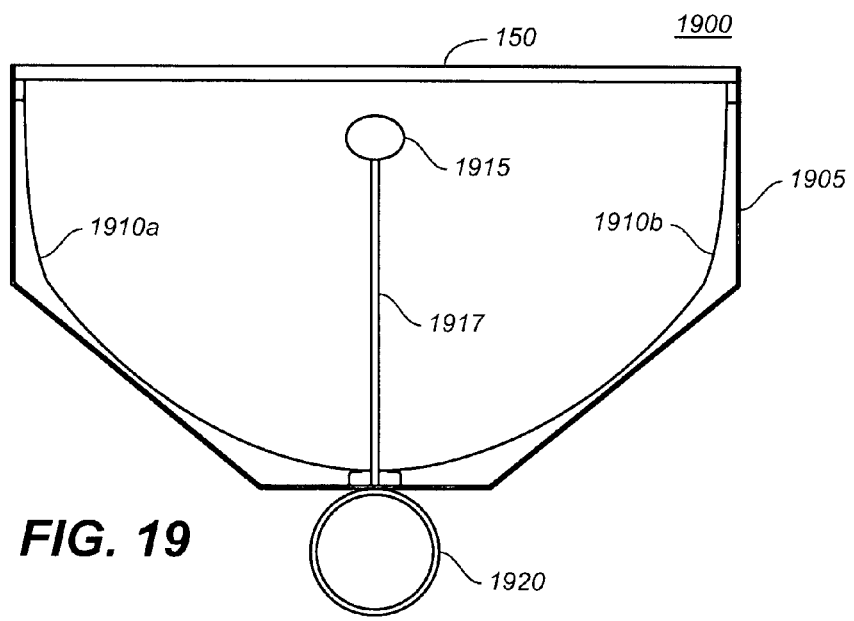
FIG. 19 shows an example solar energy collector pivotally mounted on a horizontal support bar, according to one variation.

As another example, FIG. 19 shows a variation in which a solar energy collector 1900 comprises mirrors 1910a and 1910b disposed in a housing 1905 to concentrate solar energy on a heat collector 1915 supported by a stanchion 1917. Housing 1905 is mounted on a pivotable horizontal support bar 1920 with which solar energy collector 1900 may be pivoted. In some variations, heat collector 1915 is in fluid communication with the interior of horizontal support bar 1920 via stanchion 1917. In such variations horizontal support bar 1920 may store working fluid heated by heat collector 1915.

Generally, any suitable method of pivotably mounting a solar energy collector may be used with the solar energy collectors disclosed herein. However, in some variations solar energy collectors disclosed herein may be operated with out need for pivoting. Hence pivotal mounting is not required.

Additional Example Solar Energy Collectors

Figure 20A:
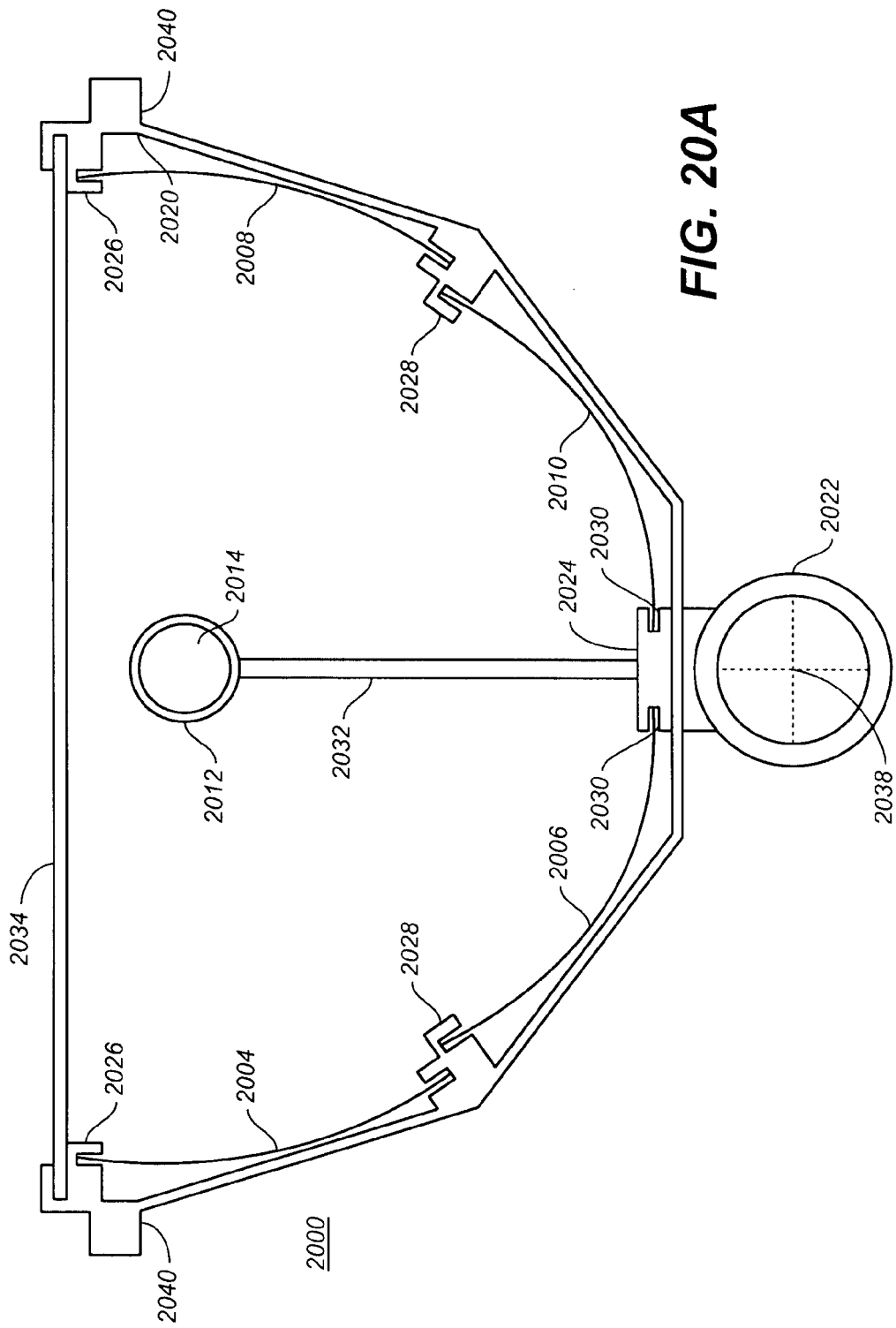
FIGS. 20A-20C show views of another example solar energy collector according to one variation.
Figure 20B:
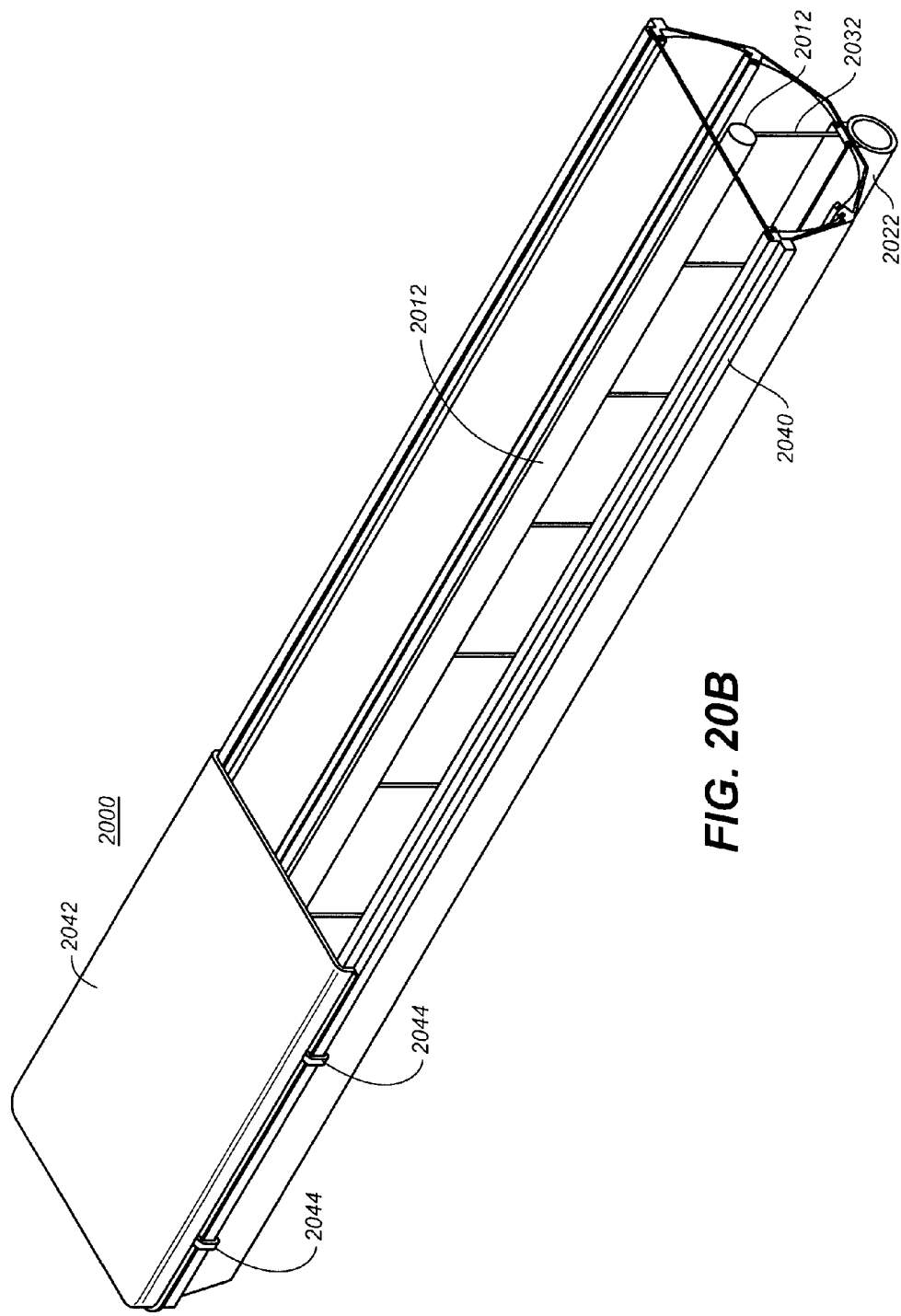
Figure 20C:
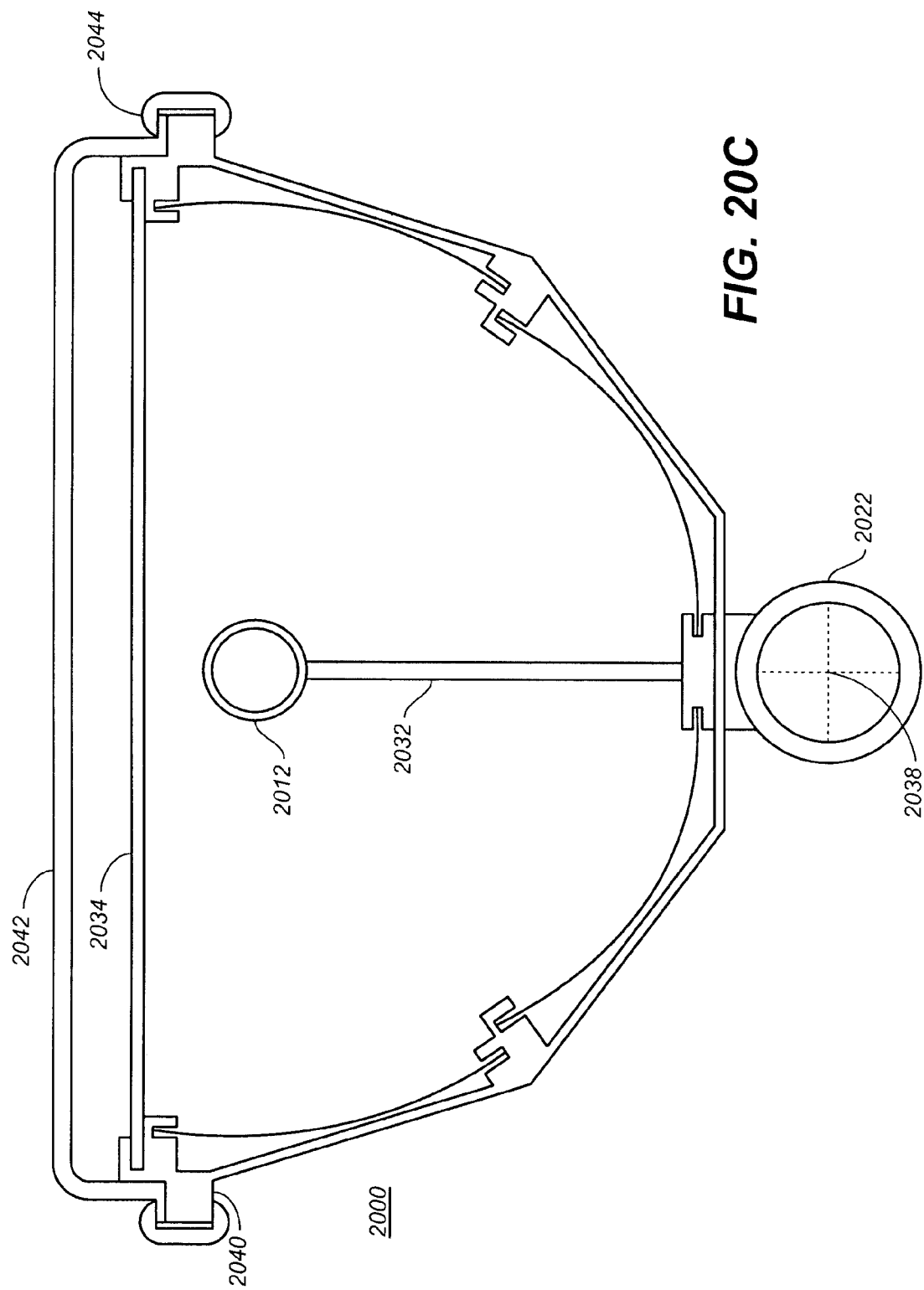

FIGS. 20A-20C show another example solar energy collector, solar trough 2000. Trough 2000 tracks the movement of the sun, includes protection from storms and features removable reflectors for maintenance. The trough is designed to focus and direct the sun's radiant energy into a heat collector tube that heats a fluid which is then used to create steam. The steam can be used for electricity, desalination, absorption cooling for HVAC and refrigeration, electrolysis, reformation, and hot water.

The trough collects the radiant energy generated by the sun and reflects the heat and light off removable reflectors into a heat collector tube to heat a heat transfer fluid. The heat transfer fluid is circulated in the heat collector tube and attains temperatures as high as about 400° F., more generally in the range from about 100° F. to about 550° F.

The trough has a protective lens (transparent cover) enclosing the system and protecting against the corrosion of interior metals, and other environmental ill-effects. On either side of the upper exterior housing of the trough, horizontally placed rails (upper brackets or rails) run the length of the trough. The rails are used to fasten an impact resistant lens shield (storm cover) to protect against storm damage.

The trough system is mounted on top of a horizontal support bar. This support bar can pivot from a 0 degree plane to a 270 degree plane moving the entire trough to track the position of the sun as well as to store the trough in a lens facing earth position to protect against storm damage.

In the interior of the housing, four removable reflectors are secured by clips (slotted brackets or rails) which hold a parabolic reflector metal in place and focuses the solar heat and light at the heat collector tube. The removable reflectors can be replaced for efficient long term operation of the trough.

The heat collector tube is located in the center of the trough and is supported by stanchions. Stanchions are evenly placed though the horizontal length of the trough. This trough system may be ideally suited for use in tropical and coastal applications. The trough may be used in a single stand alone fashion or in concert with other troughs in a variety of configurations.

The trough may be cheaper to manufacture, easier to assemble, and more cost effective to maintain the conventional solar energy collectors.

The trough is formed in a "U" shape and has a clear lens 2034 (transparent cover) over the internal housing 2020 opening allowing for solar heat and light to enter the trough but keeping moisture, salt, dust, and other unwanted environmental factors out. The upward position of the trough is facing the lens 2034 towards the direction of the sun. The downward position of the trough is facing the lens 2034 towards the direction of the earth.

The trough is mounted on a horizontal support bar 2022 which is designed to pivot around pivot axis 2038 counterclockwise from the 0 degree plane which faces the lens 2034 to the right to the 270 degrees plane which faces the lens 2034 to the ground, and return back to the 0 degree plane moving clockwise. This allows the trough to track the sun's position during the day and to be stored in a face down position at night or during storms. An electric motor and gear (not shown) turns the horizontal support bar 2022. The motor may be controlled by a direct digital software program working in cooperation with a protocol designed to calculate the suns position relative to date and time and utilizes a photovoltaic solar panel (not shown) that actively and instantaneously reports the intensity of the sun relative to the trough opening.

An impact resistant lens exterior rail 2040 (upper bracket or rail) is located on the external housing 2018 near the trough opening.

On the interior of the trough, four removable reflectors are shaped in open faced parabolas and aimed at the heat collector tube 2012. Upper left removable reflector 2004 is held in place by interior reflector upper clip (upper bracket or rail) 2026 and interior reflector middle clip (side bracket or rail) 2028. Lower left removable reflector 2006 is held in place by interior reflector middle clip (side bracket or rail) 2028 and interior reflector base clip (slot in base bracket) 2030. Upper right removable reflector 2008 is held in place by interior reflector upper clip (upper bracket or rail) 2026 and interior reflector middle clip (side bracket or rail) 2028. Lower right removable reflector 2010 is held in place by interior reflector middle clip (side rail or bracket) 2028 and interior reflector base clip (slot in base bracket) 2030. In some variations, the reflectors have a reflectivity of greater than 89% and/or are composed of a multi-layered composite. The reflector metal may be, for example, about 0.5 mm in thickness.

The heat collector tube 2012 is suspended horizontally in the trough and supported by evenly placed stanchions 2032. Stanchions are fastened to the internal bottom of the housing. The heat collector tube 2012 is filled with a heat transfer fluid 2014 that circulates through the trough.

In some variations, heat collector tube 2012 is in fluid communication with the interior of the horizontal support bar 2022 via stanchions 2032. In such variations horizontal support bar 2012 may store working fluid heated by heat collector tube 2012. In other variations heat collector tube 2012 is not in fluid communication with horizontal support bar 2022 and heated working fluid is not stored in horizontal support bar 2022.

Impact resistant lens shield (storm cover) 2042 may be attached to the impact resistant lens exterior rail (upper bracket or rail) 2040 by impact resistant lens shield fasteners 2044.

In other variations, the external housing shape can be modified, different materials, sizes, and interconnections can be used for all components, a fill material may be applied to the surface of the interior housing wall behind the removable reflectors, interior reflector middle clips (side brackets) may be absent, and/or there may be multiple heat collector tubes in the trough.

Figure 21:
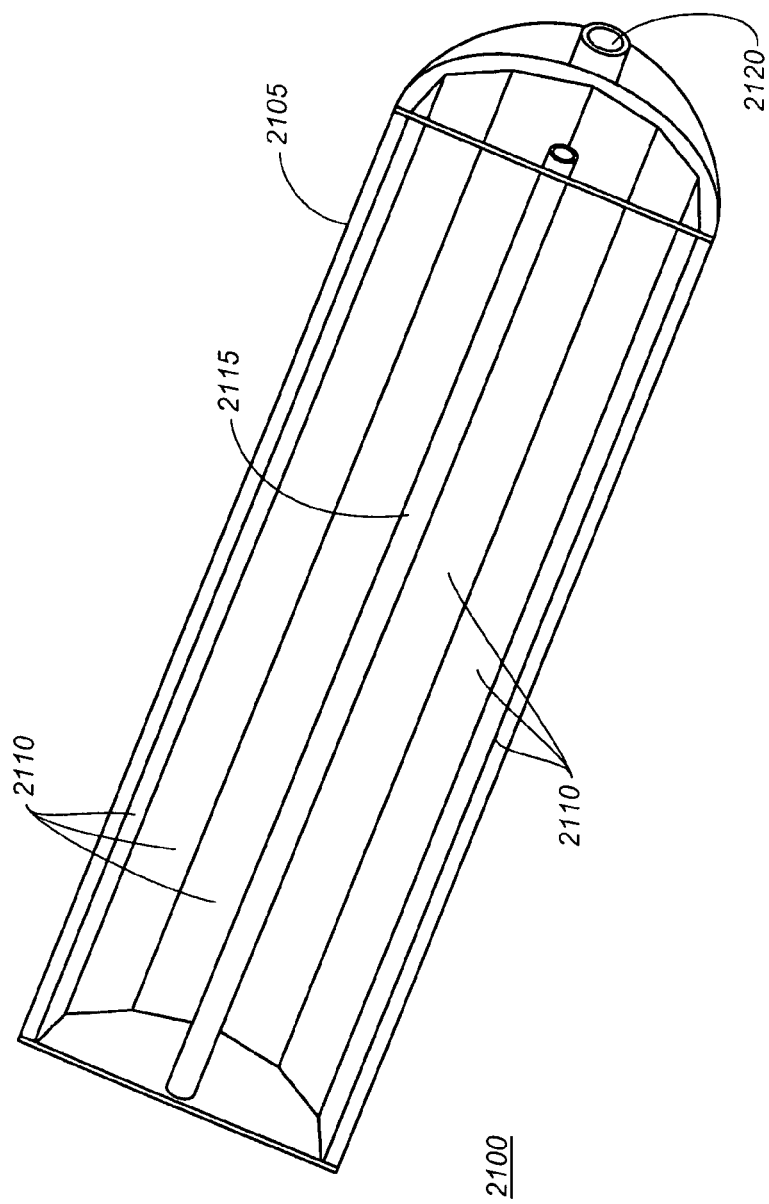
FIG. 21 shows an example solar energy collector comprising six mirrors according to one variation.

Referring now to FIG. 21, another example solar energy collector 2100 comprises six mirrors 2110 disposed within a housing 2105 to concentrate solar radiation on a heat collector 2115. Housing 2105 is supported by support bar 2120, about which solar energy collector 2100 may pivot in some variations.

Figure 22:
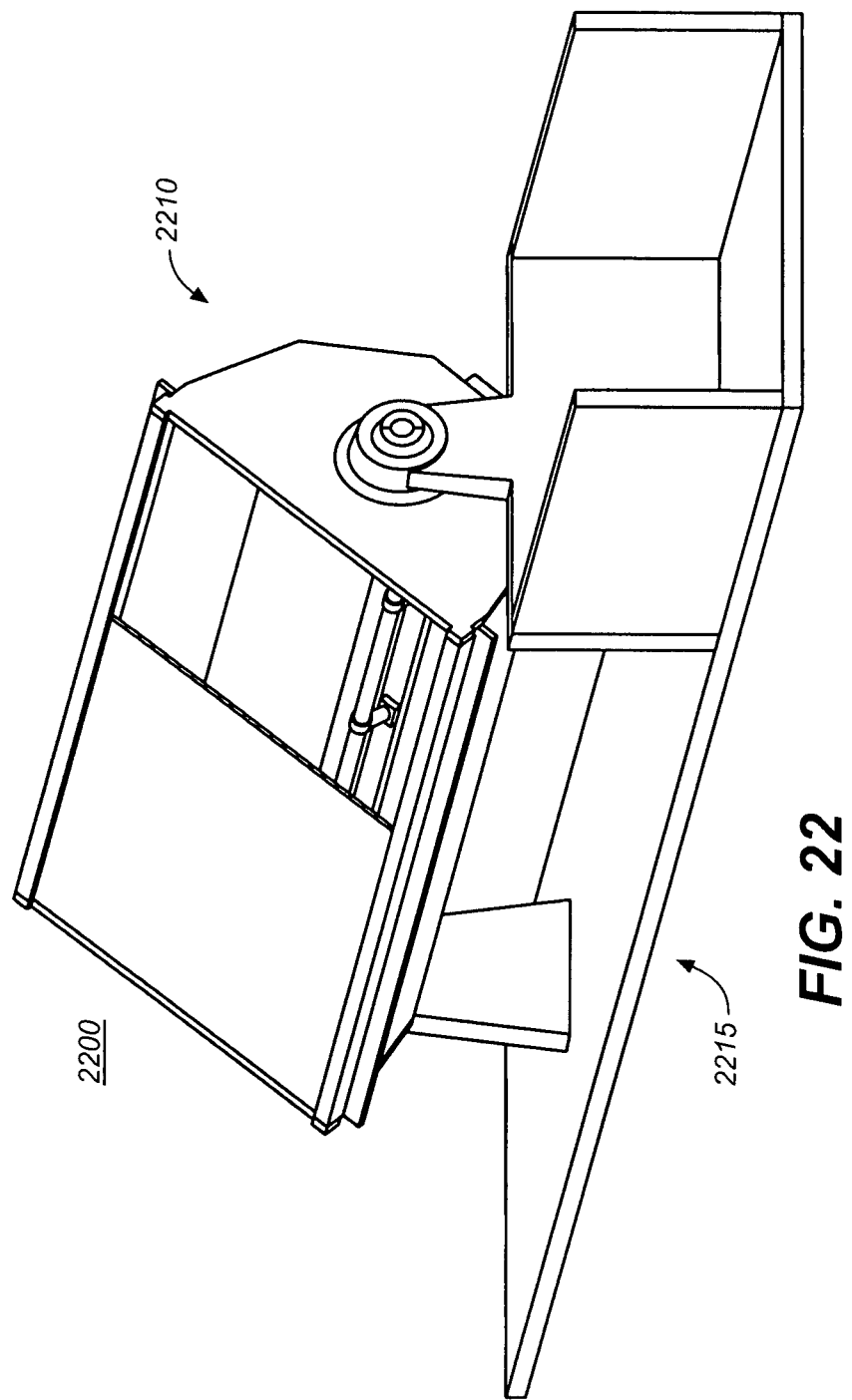
FIG. 22 shows a portable solar energy collector system according to one variation.

FIG. 22 shows a portable solar energy collector system 2200 comprising a solar energy collector 2210 mounted (optionally, pivotably mounted) on a pallet or skid 2215. Solar energy collector 2210 may be, for example, one or more of any suitable solar energy collector disclosed herein. In one variation, solar energy collector 2210 is solar energy collector 100 (FIGS. 1A-1D) or a modification thereof. In another variation, solar energy collector 2100 is solar energy collector 200 (FIG. 2) or a modification thereof. In some variations, solar energy collector system 2200 may be mounted in, shipped, and/or operated from a standard cargo container or a modification thereof.

Portable solar energy collector system 2200 may be, for example, transported to and installed at the proposed site for a larger installation of solar energy collectors. At the site, portable solar energy collector system 2200 may be used to collect performance data (e.g., operating temperatures) with which to evaluate the site. Such performance data may then be used to design the proposed solar collector installation by, for example, determining the number and/or type of solar collectors to install.

In other variations, portable solar energy collector system 2200 may be transported to a rural location, for example, used to produce hot air with which to dry agricultural material (e.g., grains, macadamia nuts, other nuts, other seeds, other biomass), and then removed from the location when no longer needed there.

In yet other variations, portable solar energy collector system 2200 may be used as a portable solar power source for solar air conditioning or for making hot water for human or industrial use. Generally, solar energy collector system 2200 may be used for any suitable application.

Assembling One or More Solar Energy Collectors

In some variations, solar energy collectors having a length of about 8 feet are assembled into three-collector sections having a length of about 24 feet. The sections are then assembled into rows. A row may have a typical length of about 168 feet (21 collectors in length, ganged into 7 sections of 3 collectors with 8 support stands) in some variations. The collectors in a row pivot on bearings supported by stands between the sections. One, two, or more drive motors at each end of a row may be used to pivot the collectors to track the sun.

A method for assembling solar energy collectors to form a row may include the following steps, though in some variations some steps may be performed in a different order, may be performed concurrently, or may be omitted. Assembly methods in some variations may include additional steps, as well. To assemble a row of one variation of a solar energy collector 100 (FIGS. 1A-1D):

1. Begin with collector upside down (upside down "U").

Get a bottom bracket. Ensure gasket material is on bottom bracket surface and dampening materials are on reflector holders.

Attach lower panels on bottom bracket surface using screws, for example.

Attach the base plate on top of the lower panels using screws, for example.

2. Flip U right side up so base plate is touching the ground.

Connect 4 stanchion rods into bottom bracket (to support 4 heat collector tube holders). The bottom bracket is tapped for the stanchion rods, which will screw directly into the bottom bracket.

3. Install 4 lower ribs per each 8' length of collector by, for example, screwing them to the panels.
  4. Attach side brackets to lower panels
    Ensure gasket material is on side bracket surface and fasten lower panel into side bracket
    Ensure dampening materials are on reflector holders.
  5. Install lower reflectors.
    The lower portion of the reflector will have slotted grooves that fit around the stanchion rods.
    Mold reflectors to shape of spar and attach screw-down plate on side bracket to lock bottom reflectors in place.
  6. Attach end cover/end cap to one side of collector and screw onto lower panels.
  7. Attach joining bracket to lower panels at other side of collector using screws, for example
  8. Attach upper brackets to upper panels.
  9. Attach upper panels to side brackets, end cover/end cap, and joiner bracket.
    Install upper ribs
    Install upper reflector by inserting into upper bracket first and sliding into side bracket.
    Attach screw-down plates to side brackets to lock reflectors in place.
  10. Complete Steps 1-9 for 2 additional collectors to build a 3 collector section.
  11. Place transparent cover (about 21 feet long) over the collector housing, on top of gasket, and attach with upper bracket.
  12. Lift 3 panel ganged collector onto support stands with crane.
    The End Cap will sit into and on top of the support stands.
  13. Continue until complete row is constructed (e.g., 168' long consisting of 21-8' collectors, ganged into 7 sections of 3 panels and 8 stands).
  14. Installation of the heat collector tube
    For the entire length of the row, the heat collector tube base support bracket should be installed on top of the stanchions.
    The heat collector tube is installed linearly from one end of the row and placed on top of the brackets.
    The tube may have a coupler that connects multiple lengths as necessary.
    In middle stands the tube may sit in the mount.
    At the ends of the rows an insulated flex hose may connect the tube to a distribution piping systems.
    Once heat collector tube is installed, the top heat collector tube bracket is secured on the stanchions and screwed into place, securing the heat collector tube.
Applications Solar energy collectors as disclosed herein may be used for any suitable applications. Such applications may include, but are not limited to, the production of hot water or steam (directly or via heat transfer from a working fluid) and the production of hot air or other gases.

Hot water produced with the solar energy collectors disclosed herein may be used for example, for residential or industrial uses. Steam produced with the solar energy collectors may be used, for example, for generation of electricity, for desalination, for absorption cooling for HVAC and refrigeration, for electrolysis, for reformation, and for producing hot water. Hot air or other gases may be used, for example, to dry agricultural material (e.g., grains, macadamia nuts, other nuts, other seeds, other biomass).

This invention has been described and specific examples of the invention have been portrayed. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the inventions. Additionally, certain of the steps may be performed concurrently in a parallel process when possible, as well as performed sequentially as described above. Therefore, to the extent there are variations of the invention which are within the spirit of the disclosure or equivalent to the inventions found in the claims, it is the intent that this patent will cover those variations as well. Finally, all publications and patent applications cited in this specification are herein incorporate by reference in their entirely as if each individual publication or patent application were specifically and individually put forth herein. In particular International Patent Application Serial No. PCT/US07/13618, filed Jun. 8, 2007, titled "Apparatus and Methods for Concentrating Solar Power," is incorporated herein by reference in its entirety as if specifically and individually put forth herein.

What is claimed as new and desired to be protected by Letters Patent of the United States is:

1. A concentrating solar energy collector comprising:
  a) an open housing comprising a first panel and a second panel;
  b) a first bracket connecting the first panel and the second panel to provide an exterior housing wall;
  c) a heat collector;
  d) a first reflector positioned within said housing to receive solar radiation and concentrate at least a portion of said solar radiation on said heat collector; and
  e) a second reflector, a first rib and a second rib, the first rib contacting the first panel and at least a portion of the first reflector and the second rib contacting the second panel and at least a portion of the second reflector, wherein the first rib compresses the first reflector to provide a shape of a first portion of a parabolic trough, and wherein the second rib compresses the second reflector to provide the second reflector a shape of a second portion of said parabolic trough, and wherein the concentrating solar energy collector has no cover over said first and second reflectors, wherein the housing comprises a third panel connected to the first panel by a second bracket and a fourth panel connected to the second panel by a third bracket,
  wherein the first bracket has a first slot to receive a portion of said first reflector, and wherein the heat collector is positioned between the first reflector and the second reflector so as to receive solar radiation reflected by the first reflector and the second reflector.

2. The collector of claim 1 wherein the bracket has a first notch to receive a portion of the first panel and a second notch to receive a portion of the second panel.

3. The collector of claim 1 wherein the bracket has a second slot to receive a portion of the second reflector.

4. The collector of claim 3 wherein the first slot and the second slot are opposite one another.

5. The collector of claim 3 wherein the first slot and the second slot are offset from one another.

6. The collector of claim 3 wherein the first slot and the second slot are formed by a removable bracket portion having wings that form at least a part of the first slot and the second slot, such that removing said bracket portion loosens the first reflector and the second reflector enabling removal or replacement of said first reflector and said second reflector.

7. The collector of claim 1 wherein the bracket supports a first stanchion supporting said heat collector.

8. The collector of claim 7 wherein the bracket supports a second stanchion supporting said heat collector.

9. The collector of claim 8 wherein the first stanchion and the second stanchion hold a first heat collector support supporting the heat collector.

10. The collector of claim 9 wherein the bracket additionally supports a third stanchion and a fourth stanchion, wherein the third stanchion and the fourth stanchion hold a second heat collector support supporting the heat collector at a point distant from the first heat collector support.

11. A concentrating solar energy collector comprising:
   a) an open housing comprising a first panel and a second panel;
   b) a first bracket connecting the first panel and the second panel to provide an exterior housing wall;
   c) a heat collector;
   d) a first reflector positioned within said housing to receive solar radiation and concentrate at least a portion of said solar radiation on said heat collector; and
   e) a second reflector, a first rib and a second rib, the first rib contacting the first panel and at least a portion of the first reflector and the second rib contacting the second panel and at least a portion of the second reflector, wherein the first rib compresses the first reflector to provide a shape of a first portion of a parabolic trough, and wherein the second rib compresses the second reflector to provide the second reflector a shape of a second portion of said parabolic trough, and wherein the concentrating solar energy collector has no cover over said first and second reflectors, wherein the housing comprises a third panel connected to the first panel by a second bracket and a fourth panel connected to the second panel by a third bracket, and
   wherein the first panel and the second panel are substantially identical or identical, and wherein the third panel and the fourth panel are substantially identical or identical, and wherein the heat collector is positioned between the first reflector and the second reflector so as to receive solar radiation reflected by the first reflector and the second reflector.

12. The collector of claim 11 wherein the second bracket and the third bracket are substantially identical or identical.

13. A concentrating solar energy collector comprising:
   a) an open housing comprising a first panel and a second panel;
   b) a first bracket connecting the first panel and the second panel to provide an exterior housing wall;
   c) a heat collector;
   d) a first reflector positioned within said housing to receive solar radiation and concentrate at least a portion of said solar radiation on said heat collector; and
   e) a second reflector, a first rib and a second rib, the first rib contacting the first panel and at least a portion of the first reflector and the second rib contacting the second panel and at least a portion of the second reflector, wherein the first rib compresses the first reflector to provide a shape of a first portion of a parabolic trough, and wherein the second rib compresses the second reflector to provide the second reflector a shape of a second portion of said parabolic trough, and wherein the concentrating solar energy collector has no cover over said first and second reflectors, wherein the housing comprises a third panel connected to the first panel by a second bracket and a fourth panel connected to the second panel by a third bracket, and
   wherein the collector further comprises
   f) a fourth bracket secured to the third panel and a fifth bracket secured to the fourth panel, the first, second, third, fourth, and fifth brackets each having at least one reflector-receiving slot,
   g) a third reflector and a fourth reflector, wherein the first reflector is secured in compression by the slots of the first bracket and the second bracket, the second reflector is secured in compression by the slots of the first bracket and the third bracket, the third reflector is secured in compression by the slots of the second bracket and the fourth bracket, and the fourth reflector is secured in compression by the slots of the third bracket and the fifth bracket, and wherein the heat collector is positioned between the first reflector and the second reflector so as to receive solar radiation reflected by the first reflector and the second reflector.

14. The collector of claim 13 wherein the fourth bracket and the fifth bracket each additionally have a slot positioned opposite one another to receive a transparent cover that shields the reflector from ambient dirt.

15. The collector of claim 1 wherein the first rib deforms the first reflector to provide a portion of a shape of a first parabola, and wherein the second rib deforms the second reflector to provide a portion of a shape of a second parabola such that the first reflector has a line of focus different from a line of focus, of the second reflector.

16. A concentrating solar energy collector comprising:
   a) an open housing comprising a first panel and a second panel;
   b) a first bracket connecting the first panel and the second panel to provide an exterior housing wall;
   c) a heat collector;
   d) a first reflector positioned within said housing to receive solar radiation and concentrate at least a portion of said solar radiation on said heat collector; and
   e) a second reflector, a first rib and a second rib, the first rib contacting the first panel and at least a portion of the first reflector and the second rib contacting the second panel and at least a portion of the second reflector, wherein the first rib compresses the first reflector to provide a shape of a first portion of a parabolic trough, and wherein the second rib compresses the second reflector to provide the second reflector a shape of a second portion of said parabolic trough, and wherein the concentrating solar energy collector has no cover over said first and second reflectors, wherein the collector further comprises a third rib and a fourth rib, the third rib being in contact with the first panel and the first reflector and the fourth rib being in contact with the second panel and the second reflector, and
   wherein the collector further comprises a fifth rib and a sixth rib, the fifth rib being in contact with the first panel and the first reflector and the sixth rib being in contact with the second panel and the second reflector, and wherein the heat collector is positioned between the first reflector and the second reflector so as to receive solar radiation reflected by the first reflector and the second reflector.

17. The collector of claim 1 having third and fourth panels and first, second, third, and fourth reflectors, and additionally the first rib contacting the third panel and the third reflector and the second rib contacting the fourth panel and the fourth reflector, wherein said first and second ribs provide shape to the third reflector and the fourth reflector.

18. A concentrating solar energy collector comprising:
a) an open housing comprising a first panel and a second panel;
b) a first bracket connecting the first panel and the second panel to provide an exterior housing wall;
c) a heat collector;
d) a first reflector positioned within said housing to receive solar radiation and concentrate at least a portion of said solar radiation on said heat collector; and
e) a second reflector, a first rib and a second rib, the first rib contacting the first panel and at least a portion of the first reflector and the second rib contacting the second panel and at least a portion of the second reflector, wherein the first rib compresses the first reflector to provide a shape of a first portion of a parabolic trough, and wherein the second rib compresses the second reflector to provide the second reflector a shape of a second portion of said parabolic trough, and wherein the concentrating solar energy collector has no cover over said first and second reflectors, wherein the housing comprises a third panel connected to the first panel by a second bracket and a fourth panel connected to the second panel by a third bracket, and having third and fourth panels and first, second, third, and fourth reflectors, and additionally the first rib contacting the third panel and the third reflector and the second rib contacting the fourth panel and the fourth reflector, wherein said first and second ribs provide shape to the third reflector and the fourth reflector and further comprising a third rib contacting the third panel and the third reflector and a fourth rib contacting the fourth panel and the fourth reflector, wherein said third and fourth ribs provide shape to the third reflector and the fourth reflector, and wherein the heat collector is positioned between the first reflector and the second reflector so as to receive solar radiation reflected by the first reflector and the second reflector.

19. The collector of claim 18 and further comprising a fifth rib contacting the third panel and the third reflector and a sixth rib contacting the fourth panel and the fourth reflector, wherein said fifth and sixth ribs provide shape to the third reflector and the fourth reflector.

20. A concentrating solar energy collector comprising:
a) an open housing comprising a first panel and a second panel;
b) a first bracket connecting the first panel and the second panel to provide an exterior housing wall;
c) a heat collector;
d) a first reflector positioned within said housing to receive solar radiation and concentrate at least a portion of said solar radiation on said heat collector; and
e) a second reflector, a first rib and a second rib, the first rib contacting the first panel and at least a portion of the first reflector and the second rib contacting the second panel and at least a portion of the second reflector, wherein the first rib compresses the first reflector to provide a shape of a first portion of a parabolic trough, and wherein the second rib compresses the second reflector to provide the second reflector a shape of a second portion of said parabolic trough, and wherein the concentrating solar energy collector has no cover over said first and second reflectors, wherein the housing comprises a third panel connected to the first panel by a second bracket and a fourth panel connected to the second panel by a third bracket wherein said second bracket and said third bracket each has a length about equal to or equal to a length of the first panel and the second panel, and wherein the heat collector is positioned between the first reflector and the second reflector so as to receive solar radiation reflected by the first reflector and the second reflector.

21. The collector of claim 1 wherein said first bracket is an extruded metal bracket.

22. The collector of claim 20 wherein all of said brackets are extruded metal.

23. A method of assembling a concentrating solar energy collector, the method comprising:
a) coupling a first panel to a second panel with a first bracket having first and second slots to form at least a portion of a bottom section of an open housing;
b) coupling a third panel to said bottom section of said housing with a second bracket to form at least a portion of a first side of said housing;
c) coupling a fourth panel to said bottom section of said housing with a third bracket to form at least a portion of a second side of said housing; and
d) positioning a first and second reflector within said housing in contact with a first rib and a second rib respectively to receive solar radiation and concentrate it on a heat collector; wherein the first rib contacts the first panel and at least a portion of the first reflector and the second rib contacts the second panel and at least a portion of the second reflector, wherein the first rib compresses the first reflector to provide a shape of a first portion of a parabolic trough, and wherein the second rib compresses the second reflector to provide a shape of a second portion of said parabolic trough, coupling the first reflector with the first slot of the first bracket and coupling the second reflector with the second slot of the first bracket, and coupling the heat collector to the first bracket, wherein the first, second, and third brackets have a length equal or about equal to a length of the housing, and wherein the heat collector is positioned between the first reflector and the second reflector so as to receive solar radiation reflected by the first reflector and the second reflector.

24. The method of claim 23 wherein the first reflector is placed within the housing by flexing an elastically deformable reflector and retaining the first reflector in compression within the housing.

25. A concentrating solar energy collector according to claim 1, wherein the heat collector extends linearly through the solar energy collector from a first solar energy collector mounting to a second solar energy collector mounting supporting the housing, and the housing is pivotably mounted to said first and second solar energy collector mountings such that the housing is rotatable about the heat collector.

26. A concentrating solar energy collector according to claim 16, wherein the heat collector extends linearly through the solar energy collector from a first solar energy collector mounting to a second solar energy collector mounting supporting the housing, and the housing is pivotably mounted to said first and second solar energy collector mountings such that the housing is rotatable about the heat collector.

27. A method according to claim 23, further comprising extending a heat collector linearly through the solar energy collector from a first solar energy collector mounting to a second solar energy collector mounting supporting the housing, and pivotably mounting said housing to said first and second solar energy collector mountings such that the housing is rotatable about the heat collector.

28. The collector of any of claims 16, 25, or 2 wherein said first bracket has a length about equal to or equal to a length of the first panel and the second panel.

29. A collector assembly comprising a plurality of the collector of any of claim 1, 16, 25, or 26 secured to one another.

* * * * *